(12) United States Patent
Mukai

(10) Patent No.: US 7,097,022 B2
(45) Date of Patent: Aug. 29, 2006

(54) DEVICE, METHOD AND PROGRAM FOR PAPER DISCRIMINATION

(75) Inventor: Masanori Mukai, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/047,663

(22) Filed: Feb. 2, 2005

(65) Prior Publication Data

US 2005/0133339 A1  Jun. 23, 2005

Related U.S. Application Data

(63) Continuation of application No. PCT/JP02/08814, filed on Aug. 30, 2002.

(51) Int. Cl.
*G06K 7/10* (2006.01)
*G06K 9/68* (2006.01)
*G07D 7/20* (2006.01)

(52) U.S. Cl. .................. 194/207; 194/556; 382/135; 382/209; 382/217

(58) Field of Classification Search ........... 194/207, 194/205, 206, 302; 250/548, 556, 557, 559.01, 250/559.03–559.05, 559.07; 382/135, 137, 382/138, 139, 183, 217
See application file for complete search history.

(56) References Cited

U.S. PATENT DOCUMENTS

| 4,487,306 | A | * | 12/1984 | Nao et al. ................... 194/207 |
| 4,984,280 | A | * | 1/1991 | Abe ........................... 382/135 |
| 5,199,543 | A | * | 4/1993 | Kamagami et al. ........ 194/207 |
| 5,363,949 | A | * | 11/1994 | Matsubayashi ............. 194/206 |
| 5,947,255 | A | * | 9/1999 | Shimada et al. ............ 194/207 |

FOREIGN PATENT DOCUMENTS

| JP | 2-168104 | 6/1990 |
| JP | 2-230494 | 9/1990 |
| JP | 4-291483 | 10/1992 |
| JP | 2001-331839 | 11/2001 |

* cited by examiner

*Primary Examiner*—Eileen D. Lillis
*Assistant Examiner*—Mark Beauchaine
(74) *Attorney, Agent, or Firm*—Staas & Halsey LLP

(57) ABSTRACT

The image manipulation unit (17) corrects the tilt and color shade of the paper-piece image data obtained by the optical sensor unit (13). The template comparison unit (18) makes the for-comparison banknote image data of each denomination from the paper-piece image data made by the image manipulation unit (17) and the reference data of each denomination stored in the reference data unit (19). And the process of pattern matching of the for-comparison banknote image data with the template with the corresponding denomination stored in the template unit (20) is performed for all denominations, and the denomination with the closest distance between patterns is discriminated as the denomination of the piece of paper. The result of the discrimination is stored in the memory unit (21).

20 Claims, 30 Drawing Sheets

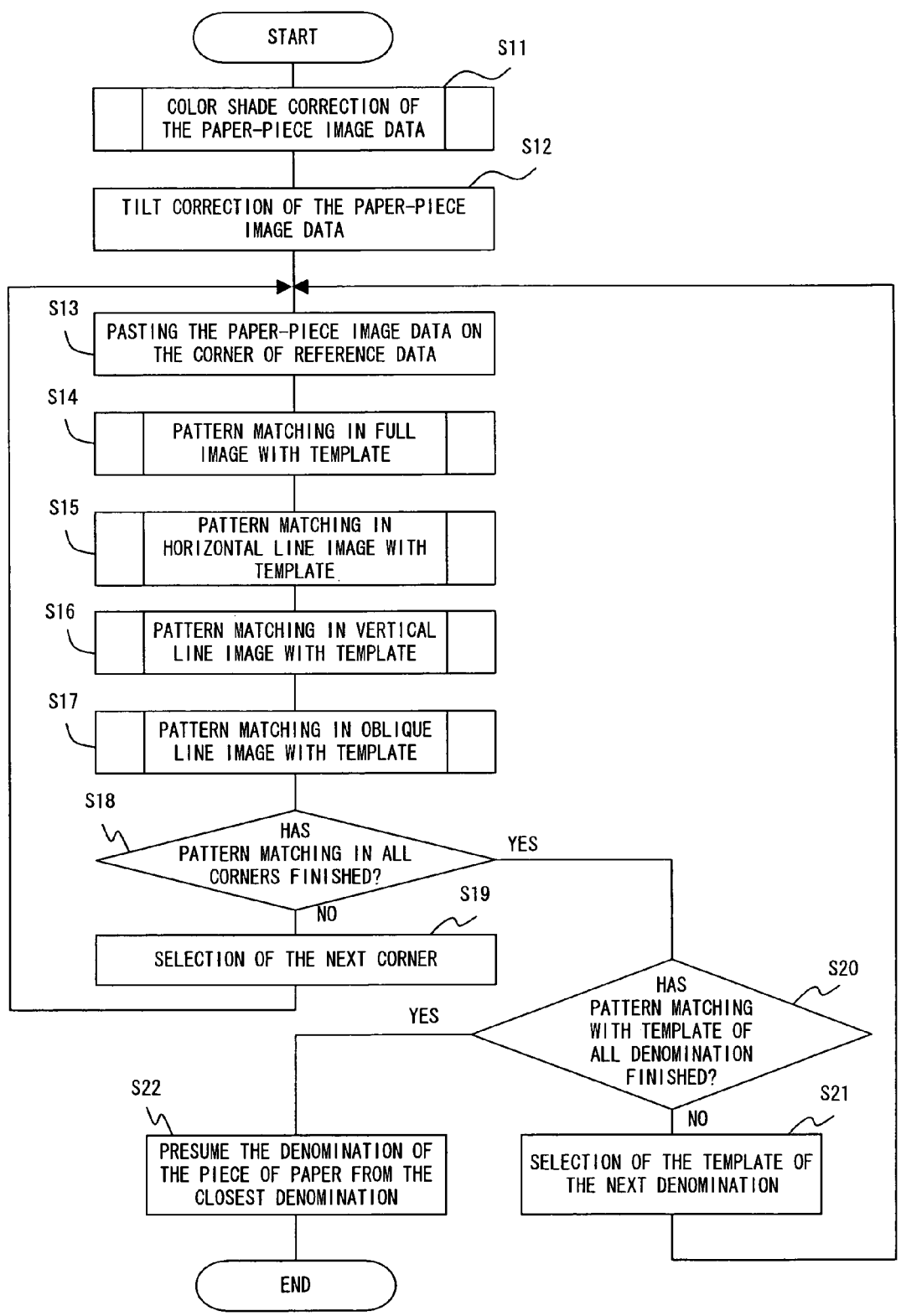
F I G. 3

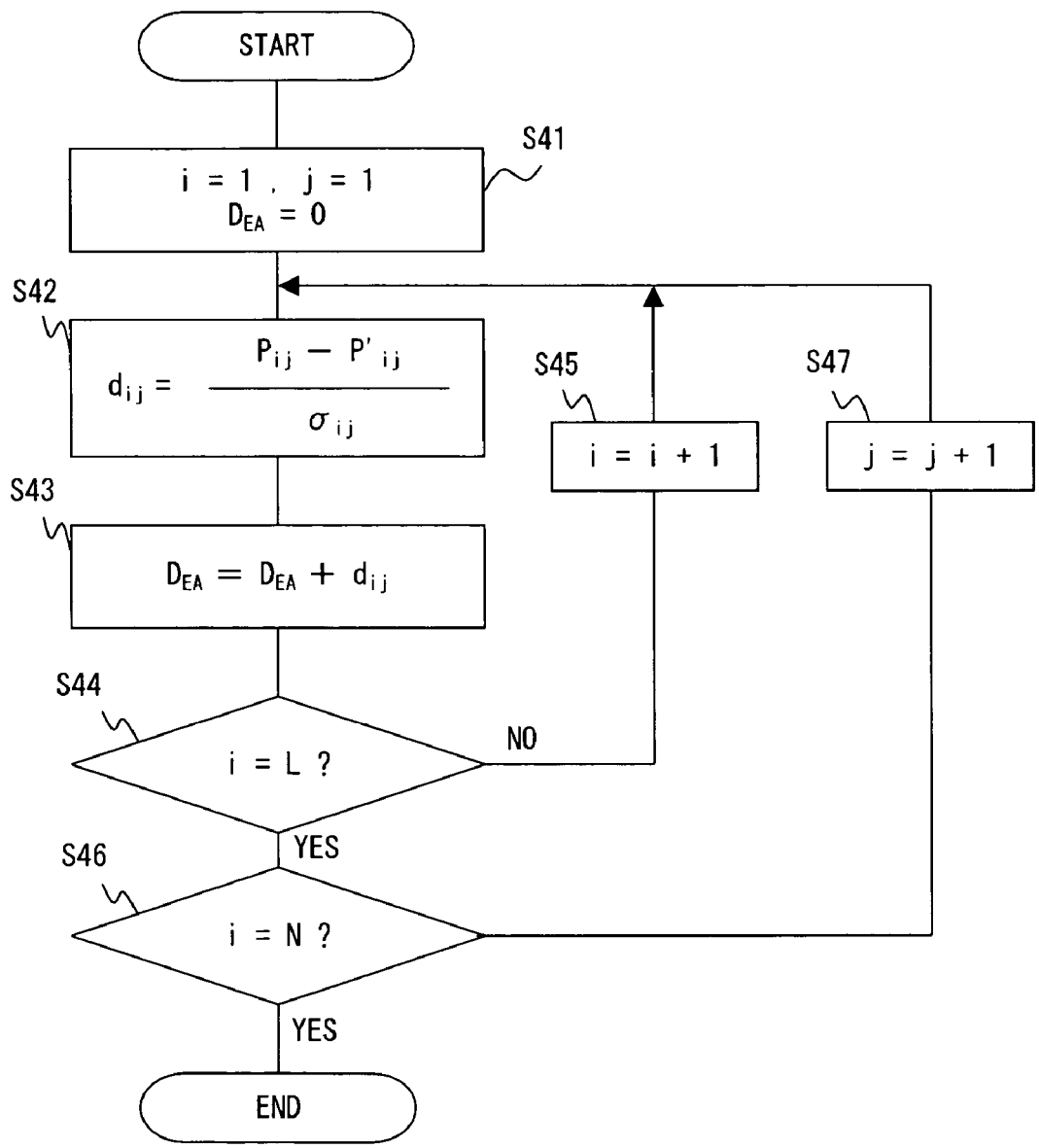
F I G. 9

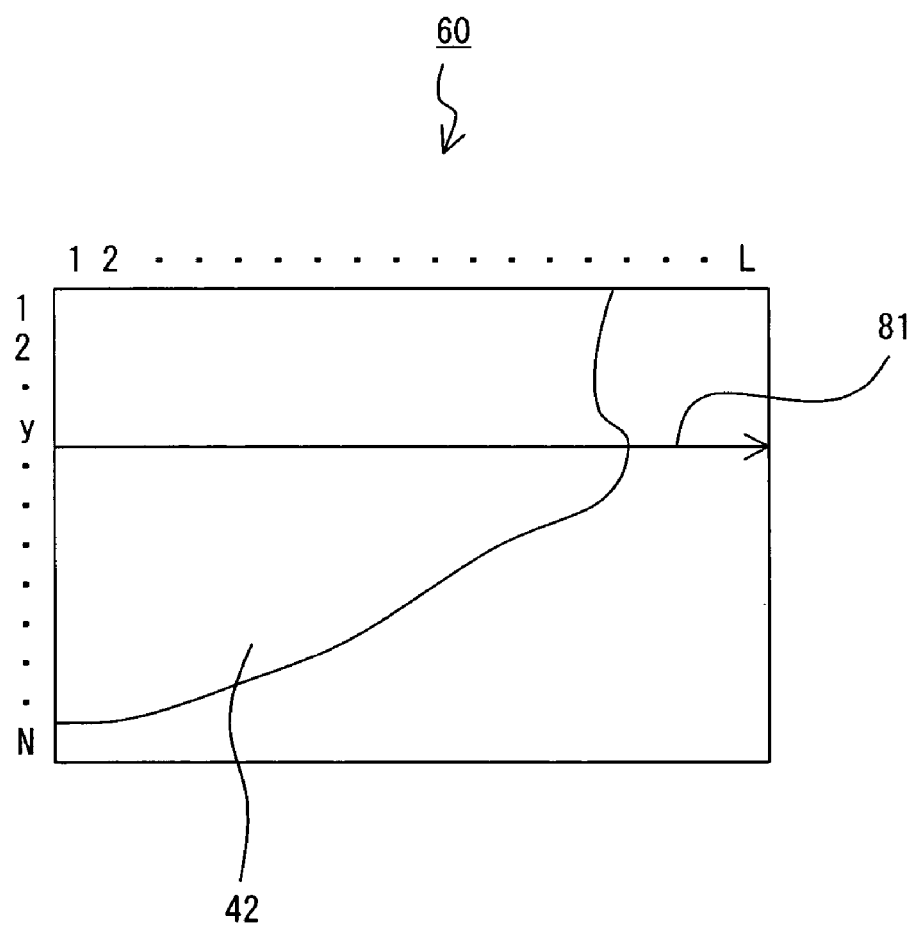
F I G. 1 0

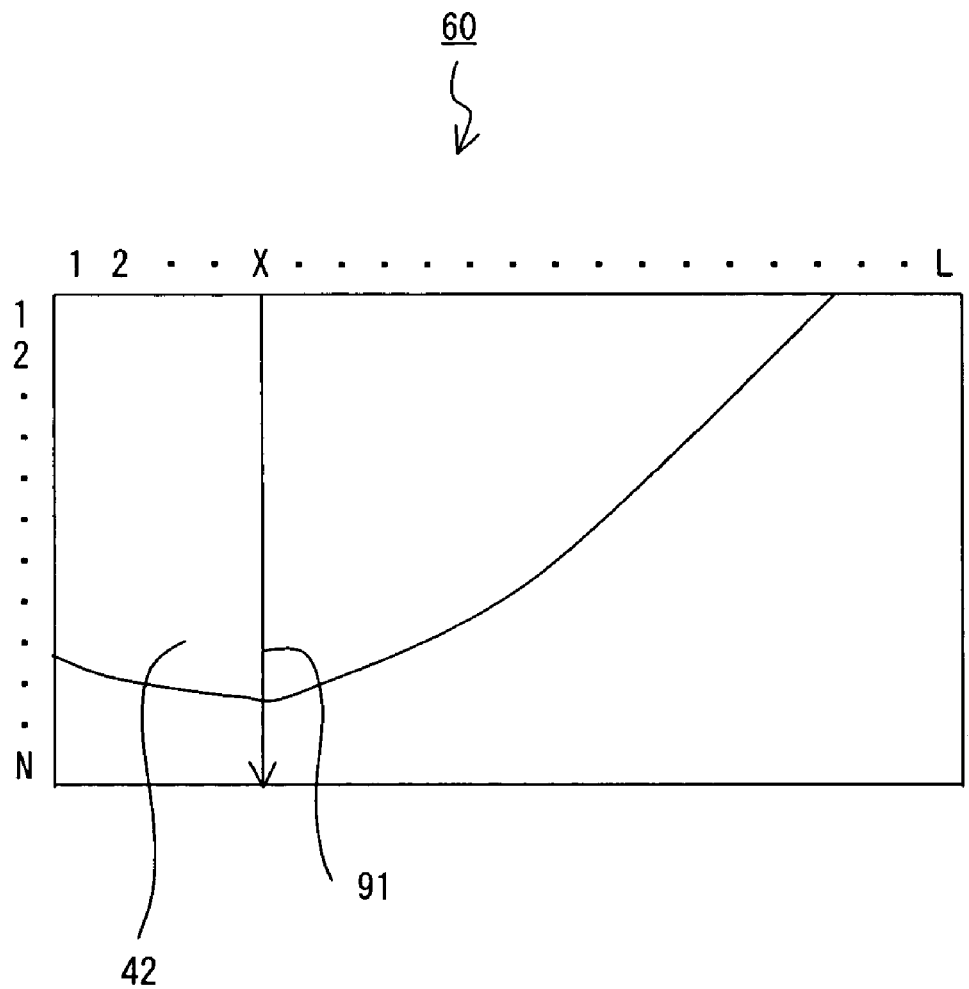
F I G. 1 2

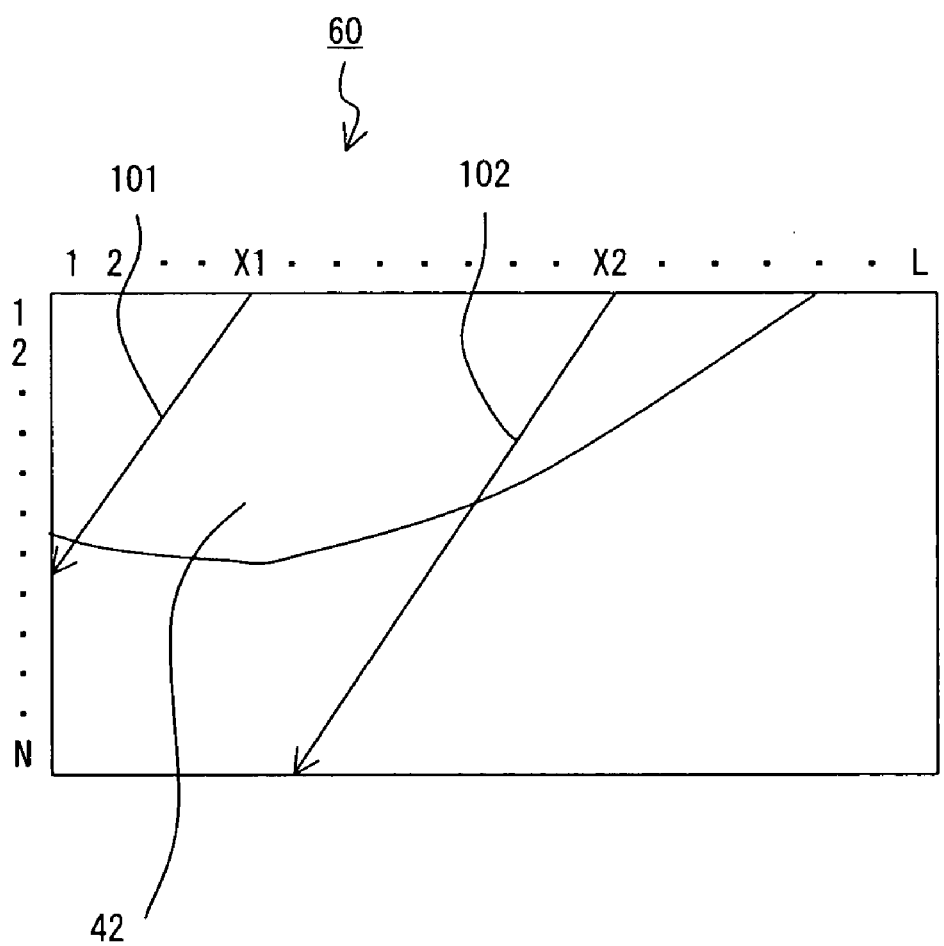
F I G. 1 4

<u>302</u>

|   | 1 | 2 | 3 | . . . . . . . . . . . . . . . . . | 22 |
|---|---|---|---|---|---|
| 1 | $I_1$ | $I_2$ | $I_3$ | | $I_{22}$ |
| 2 | $I_{23}$ | $I_{24}$ | $I_{25}$ | | $I_{44}$ |
| . | | | | | |
| 10 | $I_{201}$ | | | | $I_{220}$ |

| | 1 | 2 | . . . . . . . . . . . . . . . . . | | 22 |
|---|---|---|---|---|---|
| 1 | | | $I_1$ | | |
| 2 | | | $I_2$ | | |
| . . . . . . . . | | | ▨ | | |
| 10 | | | $I_{20}$ | | |

F I G. 2 4

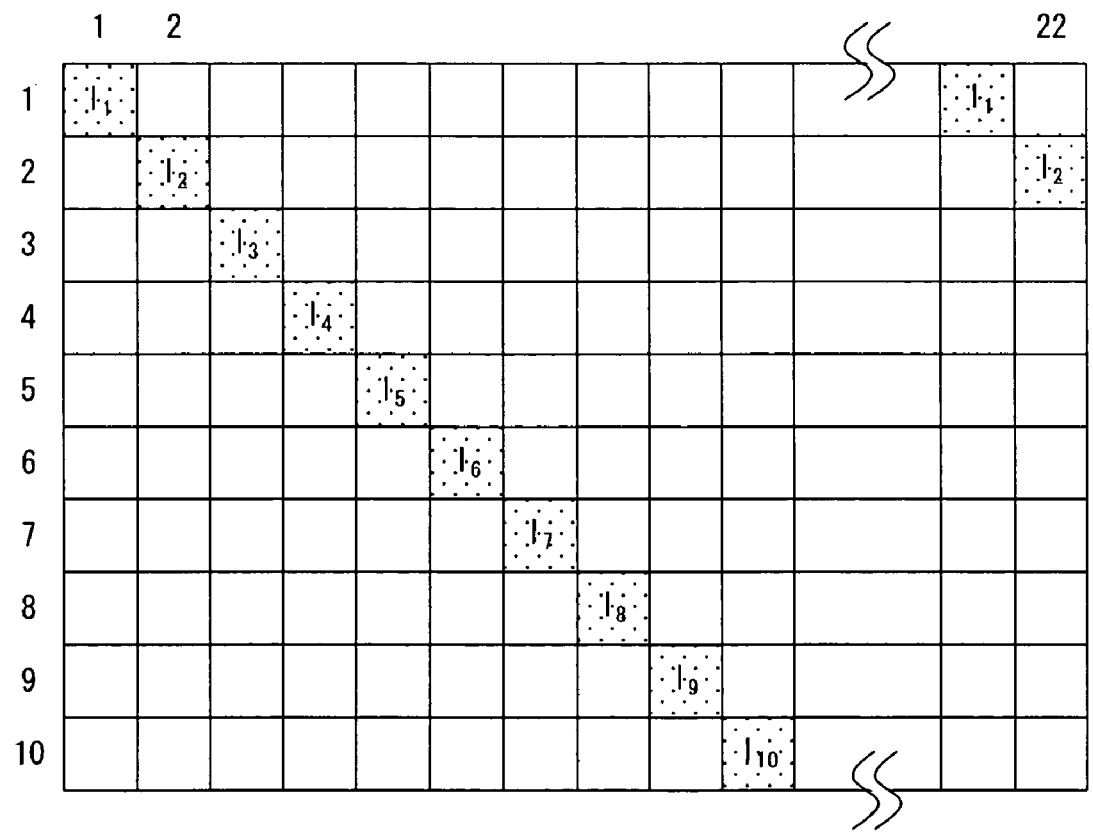
F I G. 2 6

DEVICE, METHOD AND PROGRAM FOR PAPER DISCRIMINATION

CROSS-REFERENCE TO RELATED APPLICATION

This is a continuation of an International Application No. PCT/JP02/08814, which was filed on Aug. 30, 2002.

BACKGROUND OF THE INVENTION

1. Field of the Invention

The present invention relates to a paper-piece discrimination device of a paper processor, particularly relates to the device and the method for paper-piece discrimination, which discriminate the denomination of a part of a banknote (a piece of paper) with more than half part missing.

2. Description of the Related Art

Paper processors, which receive money, such as ATM (Automatic Teller's Machine), keep paper in the machine and carry out the transaction of deposit and payment following the command input of the customer. Inside of these paper processors conducted is the discrimination process of the type (such as denominations) of the deposited and paid paper (such as banknotes).

This discrimination process is generally carried out by the following manner. The machine divides the paper into a plurality of minute domains, and measures the shape and shade of each minute domain by optical censors and thickness censors. Then, the measured value is converted to gradation value by quantifying process and stored in the machine. A certain level of image manipulation (such as the tilt correction and the color shade correction processing) is applied to the image data that consists of the obtained gradation value. The image data obtained from the above manipulation allows the discrimination of the types (denominations) of the paper (banknotes) by being compared with the template (the image data made from a genuine banknote).

However, the existing paper processors discriminate only banknotes with a normal shape and size, and reject the abnormal-shaped banknotes judging them as discrimination error. This is because the existing paper processors discriminate the type of paper by the pattern matching of image data of the whole paper with the template. Such existing paper processors, as a matter of course, were not able to identify the denominations of a part of banknote that is ripped and missing more than half banknote due to the lack of minute domains that are to be compared with the template.

However, in recent years as the use of paper processors for 24-hour operation or in unattended stores has become popularized, it has become desirable to accurately fix the balance of banknotes in the banknote storage of paper processors. In the paper processors, deposited banknotes and banknotes taken out of banknote storage for withdrawal are sometimes ripped while they are carried to the discrimination section of the machine. In such case, for the owners of the paper processors, there is a large difference between rejection with the identification of denominations and rejection without the identification of denominations of the banknote, and the rejection with the identification of denomination is more preferable. However, the discrimination section of the existing paper processors rejects the ripped banknotes without identifying their type (the denomination).

It is the object of the present invention to provide the paper-piece discrimination device and the method of paper-piece discrimination that securely identify the denomination of a part of a banknote, or a piece of paper, with more than a half of the banknote part missing.

SUMMARY OF THE INVENTION

The present invention, paper-piece discrimination device, is equipped with the reference data storage means, the template storage means, the sensor means and the reference comparison means.

The reference data storage means stores the reference data that is an image data of at least one denomination of genuine banknotes. The template storage means stores the template of genuine banknotes for discrimination. The number of denomination of the template should be the same number as that of the above-mentioned reference data. The sensor device obtains the image data of a ripped piece of a banknote. The template comparison means synthesizes the image data obtained from the sensor device and the reference data stored in the reference data storage device and makes banknote image data of each denomination for comparison. By pattern matching the banknote image data and the template stored in template storage means, the template comparison means discriminates the denomination of the ripped piece of a banknote.

The above-mentioned reference data is the image data of genuine banknotes. The for-comparison banknote image data is a synthesized data obtained by pasting the image data of the piece of paper onto the reference data. Except for the part of image data 50 that is the data from the piece of paper, the for-comparison banknote image data should corresponds to the template because the template is also obtained from genuine banknote. Therefore, the use of pattern matching method of the for-comparison banknote image data and the template of the same denominations makes it possible to judge whether the piece of paper is a part of a genuine banknote or not. The result of the pattern matching method also allows the device to discriminate the denomination of the ripped banknote.

BRIEF DESCRIPTION OF DRAWINGS

FIG. 3 is a flowchart that explains the whole process of paper discrimination of the device that is the primary preferred embodiment of the present invention.

FIG. 9 is the detailed flowchart describing the pattern matching process in the full image.

FIG. 10 is a pattern diagram of the pattern matching process in the horizontal line image.

FIG. 12 is a pattern diagram of the pattern matching process in the vertical line image.

FIG. 14 is a pattern diagram of the pattern matching process in the left-oblique line image.

FIG. 22 is a diagram explaining the input pattern when the neuro-operation unit recognizes the full image pattern.

FIG. 24 is a diagram explaining the input pattern when the neuro-operation unit recognizes the horizontal line image pattern.

FIG. 26 is a diagram explaining the input pattern when the neuro-operation unit recognizes the right-oblique line image pattern.

DESCRIPTION OF THE PREFERRED EMBODIMENTS

It is an object of the present invention to provide the device that identifies the types of papers (especially denominations of banknotes) from a piece of paper. This device can be integrated into all sorts of paper processors as one individual unit.

{The Primary Preferred Embodiments}

Figure 1:
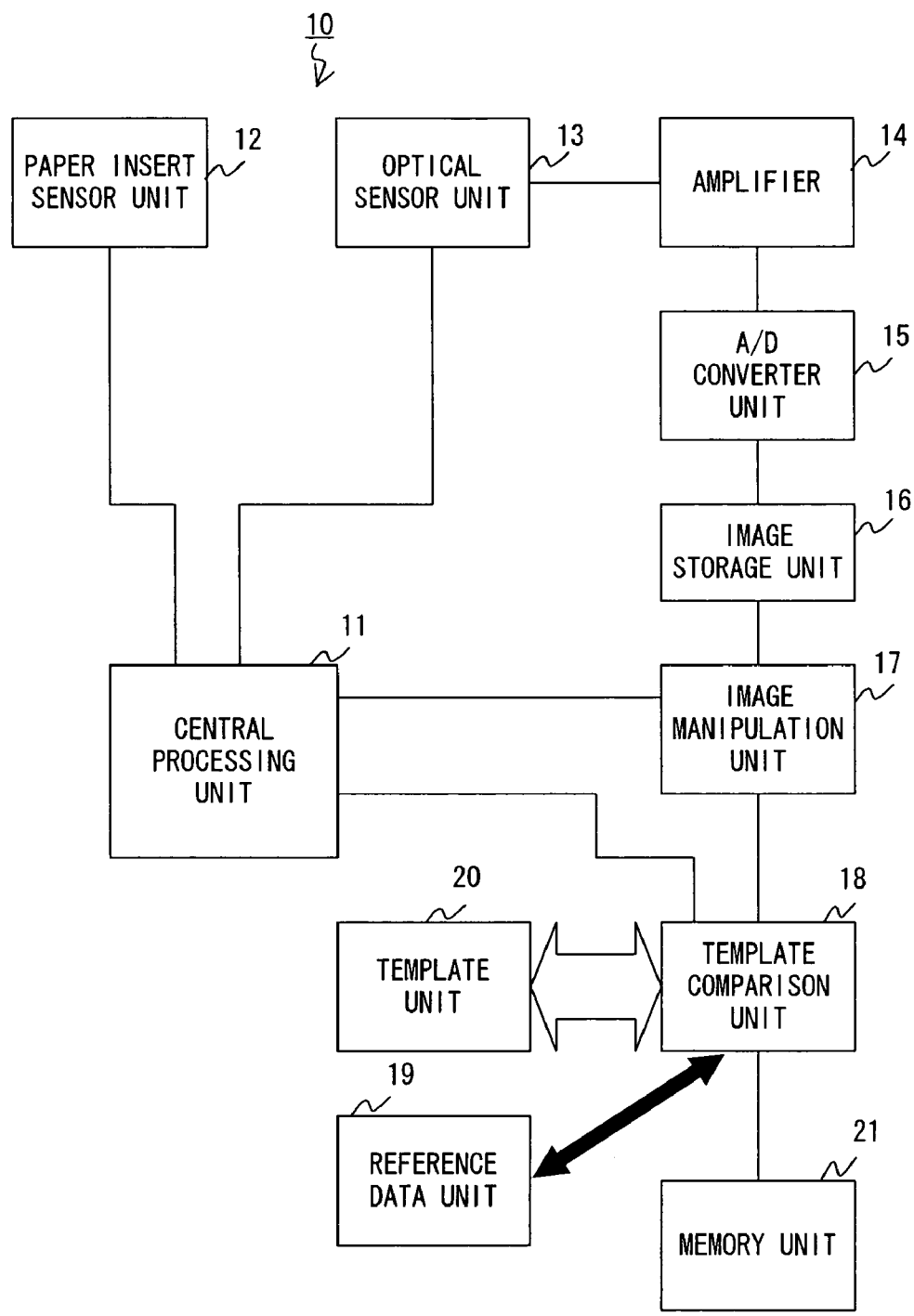
FIG. 1 is a block diagram indicating the system configuration of a paper discrimination device that is the primary preferred embodiment of the present invention.

FIG. 1 is a diagram describing the system configuration of the primary preferred embodiments of the present invention. Paper discrimination device 10, the primary preferred embodiments, in FIG. 1 comprises the central processing unit 11, the cards insert sensor unit 12, the optical sensor unit 13, the amplifier unit 14, the A/D converter unit 15, the image storage unit 16, the image manipulation unit 17, the template comparison unit 18, the reference data unit 19, the template unit 20 and the memory unit 21. And the explanation hereafter explains the device of the present preferred embodiments handling banknotes that is a kind of paper.

The paper insert sensor unit 12 is a sensor that detects the insertion of paper (a banknote) into the device 10. The sensor notifies the central processing unit 11 of this insertion of the paper.

The optical sensor unit 13 is a line sensor that obtains the image of the banknote carried in the device 10 by the unit of line after the banknote is detected at the cards insert sensor unit 11. The central processing unit 11 starts the optical sensor unit 13 on receiving the notice from the paper insert sensor unit 12, and controls the sampling frequency and sampling time period of the optical sensor unit 13, depending on the carrying speed of the paper. The optical sensor unit 13 obtains the analog image signals of the carried banknote under the control of the central processing unit 11, and outputs the signals to the amplifier unit 14.

The amplifier unit 14 amplifies the analog image signals coming from the optical sensor unit 13, and outputs the signals to the A/D converter 15.

The A/D converter 15 converts the analog image signals inputted from the amplifier 14 into the digital image signals, and outputs the digital image signals. These digital image signals are gradation value with the darkest point of 0 and the brightest point of the maximum value. This gradation value is obtained from each pixel.

The digital image signals from the A/D converter 15 are stored in sequence in the image storage unit 16. Consequently, the image storage unit 16 stores the digital image signals of the image of the paper, or the piece of paper, which are originally obtained by the optical sensor unit 13. These digital image signals are larger than the original paper in size, containing the background image of the paper as it is explained later.

Under the control of the central processing unit 11, the image manipulation unit 17 adjusts the coordinates (tilt correction) of the image signals (the image data) that are stored in the image storage unit 16. This process regularizes the image of the paper, or the piece of paper. The image manipulation unit 17 also adjusts the color shade of the regularized image data. After the adjustment of the coordinates and the color shade, the image storage unit 16 outputs the image data of the paper, or the piece of paper, to the template comparison unit 18.

In the template comparison unit 18, the pattern matching method is applied to authenticate the paper inserted to the device 10 by comparing the image data input from the image manipulation unit 17 with the template stored in the template unit 20. Also, it is a characteristic related to the present invention that when the image data from the image manipulation unit 17 is the paper-piece image data (the image data of the piece of paper), the template comparison unit 18 superimposes (pastes) the paper-piece image data on the banknotes reference data of each denomination, and identifies the types (denominations) of the above-mentioned paper-piece image data by the pattern matching of the created image data (the for-comparison banknote image data) and the template. The reference data unit 19 stores the reference data of banknotes in all denominations that this device 10 handles. This reference data is for the use to identify denominations of the piece of paper. It is an image data made by reading the genuine banknotes with an optical sensor and its color shade is adjusted like the above-mentioned paper-piece image data. This color shade correction prevents the dapple that possibly appears when the above-said paper-piece image data is pasted on the reference data.

The template comparison unit 18 makes the for-comparison banknote image data for each denomination by superimposing the paper-piece image data on the reference data of banknotes of each denomination, and identifies, or discriminates, the denomination of the paper-piece by the comparison of the for-comparison banknote image data with the template of the same denomination.

The template unit 20 stores the template used for the authentication of the paper (the banknote) and identification of the denominations of the banknotes in the template comparison unit 18. This template is prepared for identification of all the denominations handled by the device 10 like the above-mentioned reference data. The template is made by reading the genuine banknotes with the optical sensor (the optical sensor unit 13, for example). In this case, each genuine banknote usually has variance in gradation value (color shade) in each pixel. Therefore the template is made by reading a certain number of genuine banknotes with the optical sensor, and by calculating the average values and standard deviations of gradation level of each pixel. The data of each pixel with the obtained gradation level value is stored as the template.

As for the authentication, for example, the difference of the gradation value in the equivalent pixels of both the for-comparison banknote image data and the template is calculated. If the difference of the values is within the standard deviation, both pixels are judged as they are corresponding with each other. Based on the percentage of the corresponding pixels to the whole, the banknote is authenticated.

Also, as to the discrimination of the denominations of the paper-piece by pattern matching of the template and the above-mentioned for-comparison banknote image data, the distance (Euclidean distance, for example) between the both image data is calculated and based on the distance, the denominations of the paper-piece is discriminated.

The memory unit 21 stores the result of the discrimination of the denomination and that of the authentication of the banknote discriminated (judged) by the template comparison unit 18.

Figure 2:
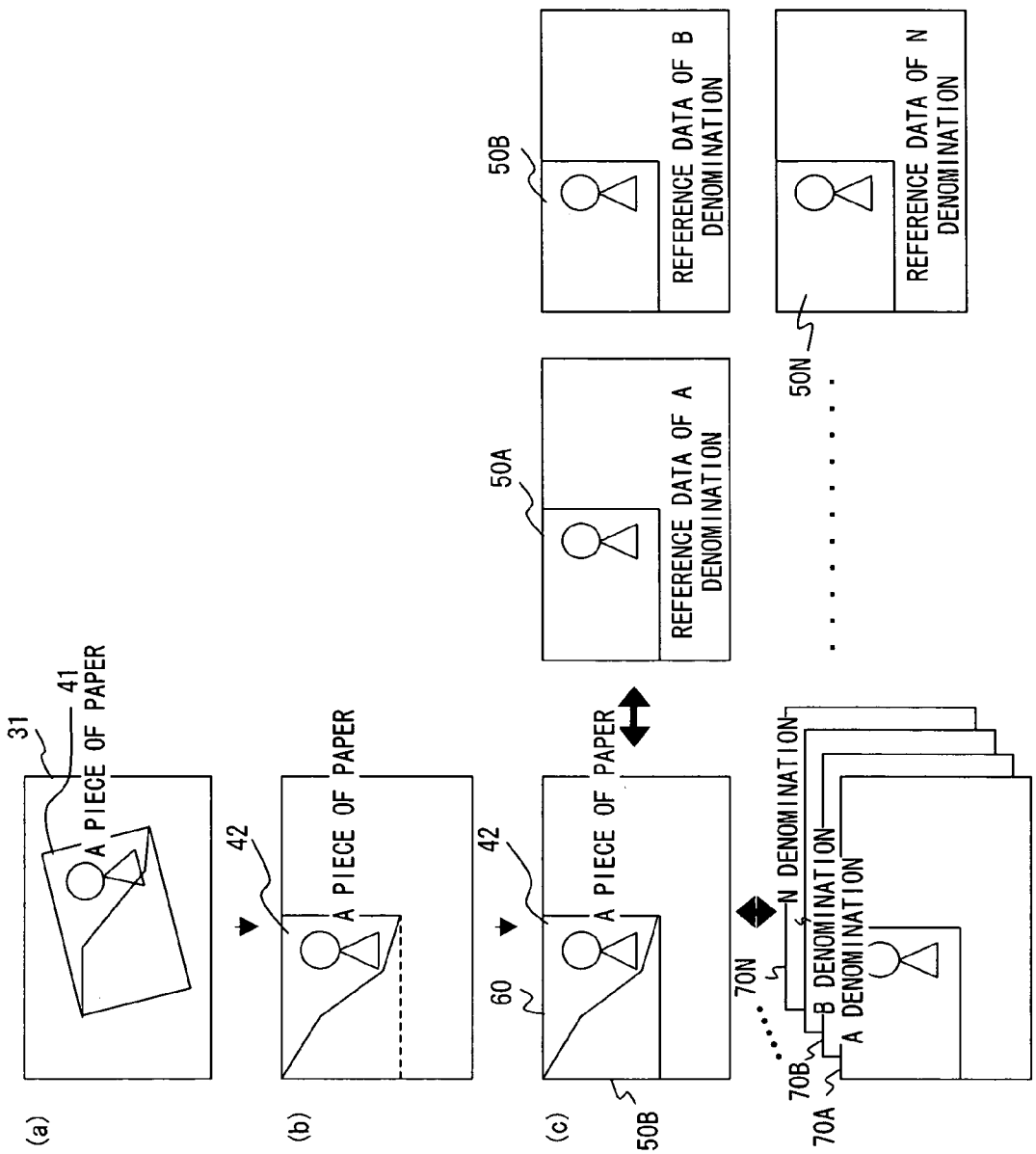
FIG. 2 is a diagram that explains the processing outline of the paper discrimination device that is the primary preferred embodiment of the present invention.

FIG. 2 is a diagram summarizing the process of paper-piece discrimination by the above-mentioned paper-piece discrimination device 10.

The original image data 31 described in FIG. 2(*a*) is an image data of apiece of paper carried on the slant, which is obtained by detecting with the optical sensor 13, and there is the paper-piece image data 41 on the center of the original data 31. As in FIG. 2(*b*), the broken line connecting the paper-piece image data 41 and frame line of the original image data 31 shows the outer frame of the missing part of the piece of paper.

The image manipulation unit 17 performs the tilt correction that corrects the slant and regularizes the above-mentioned paper-piece image data 41. hereby, an upper left corner of original data 31 is placed upon the upper left edge of the paper-piece image data 41. And to the regularized paper-piece image data 41, color shade correction is performed making the white part at the outer frame of the paper-piece (the white part in the image data at the outer frame of the paper-piece in the paper-piece image data 41) as the reference value, and ultimately the paper-piece image data 42, as it is in FIG. 2(*b*), is created.

The template comparison unit 18, as it is described in FIG. 2(*c*) makes the for-comparison banknote image data 60 for each denomination by superimposing (pasting) the corners of the above-described paper-piece image data 42 with the reference data 50, stored in the reference data unit 19, of each denomination (50A for the reference data of A denomination, 50B for the reference data of B denomination, . . . , 50N for the reference data of N denomination). These for-comparison banknote image data 60 for each denomination are the image data for pattern matching with the template 70 of each denomination (70A for the template of A denomination, 50B for template of B denomination, . . . , 50N for template of N denomination) that is stored in the template unit 20.

Incidentally, the shape of the paper-piece image data 42 (the shape of the piece of paper) determines this pasting of the paper-piece image data 42 on the reference data 50 with the corner reference. In the case of the paper-piece image data 42 shaping the abridged triangle shown in FIG. 2(*c*), the part of its right angle is presumed to be either one of the two corners of the original banknote. Therefore two kinds of the for-comparison banknote image data 60 are made by pasting the corner of the paper-piece image data 42 one on the upper right corner and another on the lower left corner of the reference data 50 (the reference data 50 in FIG. 2(*c*) is the reference data 50 of B denomination).

When the shape of the paper-piece is different from the shape in FIG. 2(*c*), the paper-piece image data 42 should be fittingly pasted on the appropriate position of the reference data 50, depending on its shape, to make the for-comparison banknote image data 60. In passing, the color shade correction, which is the same as the one made on the paper-piece image data 42 as it is described above, was applied to the reference data 50, which is used for making the for-comparison banknote image data 60. In the present preferred embodiments, the color shade correction, the same correction applied to the paper-piece image data 42, is also made on the template 70 stored in the template unit 20. Therefore, the reference data 50 and the template 70 are regarded as the same in the present preferred embodiments. That is, the exterior of the paper-piece image data 42 pasted on the for-comparison banknote image data 60 (namely the part of the reference data 50) is identical with the template 70.

Therefore, the pattern matching of the for-comparison banknote image data 60 with the template 70 is practically the pattern matching of the paper-piece image data 42 with the part of the template 70, which corresponds to the paper-piece image data 42. In this case, if the for-comparison banknote image data 60 with the paper-piece image data 42 were pasted on the original place (the original position on the original banknote) of the reference data 50, the banknote image data from comparison 60 would practically correspond with the reference data 50. Accordingly, by pattern matching the banknote image data form comparison 60 and the template of the same domination, the reference data 50 with the shortest distance would be found. As a result, the denomination of the reference data 50 is presumed to be the denomination of the piece of paper, which is the subject of the discrimination. As an another method, it is also acceptable that threshold can be set in the distance and only when the shortest distance acquired from the result of the pattern matching were below the threshold, the denomination of the piece of paper would be identified.

As it is explained above, in the present preferred embodiments, the successive pattern matching of the for-comparison banknote image data 60 with the template of all denominations allows the specification of the denomination of the shortest distance (the highest degree of resemblance), and the discrimination (the presumption) of the denomination specified is that of the piece of paper.

FIG. 3 is a flowchart explaining the process to presume the denomination of the piece of paper in the paper-piece discrimination device 10.

First, the color shade correction is made on the paper-piece image data 41 (Step S11), and the tilt correction is made on the paper-piece image data 41 (Step 12). Next, the paper-piece image data 41 is pasted on the reference data of the first choice denomination at the corner (Step S13). In pasting corners, the corner to be pasted first should be determined in advance. Also the first selected denomination of the reference data 50 should be decided in advance.

And first, the pattern matching of the above-mentioned banknote image data from comparison 60 and the template 70 (the domination of the template 70 examined first is determined in advance) is applied in full image (Step S14). Next, the pattern matching of both of the data in horizontal line image (Step S15), the pattern matching of both of the data in vertical line image (Step S16), and the pattern matching of both of the data in oblique line image (Step S17) are employed successively. The results of these four kinds of pattern matching are stored in a memory (not shown on FIG. 3).

As it is described above, after the for-comparison banknote image data 69 with the paper-piece image data 42 being pasted on a corner went through the four kinds of pattern matching, it is judged whether the four kinds of pattern matching is applied to all the for-comparison banknote image data 60 of one denomination or not (Step S18). If it is not finished, another corner of the reference data 50 (with a denomination currently selected) is selected to paste the above-mentioned paper-piece image data 42 (Step S19), and the process returns to Step S13. After Step S13, the pattern matching process is applied to the for-comparison banknote image data 60 with the paper-piece image data 42 pasted on the newly selected corner of the above-mentioned reference data 50.

In such way, as for one denomination, pattern matching process of the template 70 of the denomination and the for-comparison banknote image data is applied to all the for-comparison banknote image data 60 (the image data 60, each of which has the paper-piece image data 42 pasted on different corners of the reference data 50). After the termination of the pattern matching process to all the banknote image data from comparison 60, it is judged if the pattern matching with the template 70 of all the denominations are finished or not (Step S20). If it is not finished, the template 70 of the next denomination to go through the pattern matching is selected (Step S21) and the process returns to Step S13. At Step S13, using the reference data with newly selected denomination, the for-comparison banknote image data 60 of the denomination is prepared.

In this manner, the pattern matching processes of the template 70 and the for-comparison banknote image data 60 (the number of the for-comparison banknote image data 60 is the same number as the corners that the paper-piece image data 42 are to be pasted) are carried out for the all denominations. And when all the pattern matching process are finished, a denomination with the highest degree of resemblance is presumed to be the denomination of the piece of paper, and this result of estimation is stored in the memory unit 21 (Step S22). In addition to the denomination of the piece of paper, the data of paper-piece position on the original banknote (the position of the corner) can be stored in the memory unit at Step S22. The acquisition of this data of paper-piece position is possible by storing the data of the latest corner selected in Step S19 in a memory (not shown in FIG. 3).

In passing, the method of the above-described pattern matching can be the wide known method that takes the closest distance between the patterns. And for the discrimination process of the denomination of the piece of paper explained in FIG. 3, the following four kinds of the pattern matching method are employed.
(1) Pattern matching in full image
(2) Pattern matching in horizontal line image
(3) Pattern matching in vertical line image
(4) Pattern matching in oblique line image The highest degree of resemblance (or the shortest distance) obtained from these four kinds of the pattern matching is used as the index. However, any one of the results of the above-mentioned (1) through (4), or the combination of pattern matching (one to three kinds) selected from (1) through (4) can be the index of the paper-piece denomination discrimination.

Figure 4:
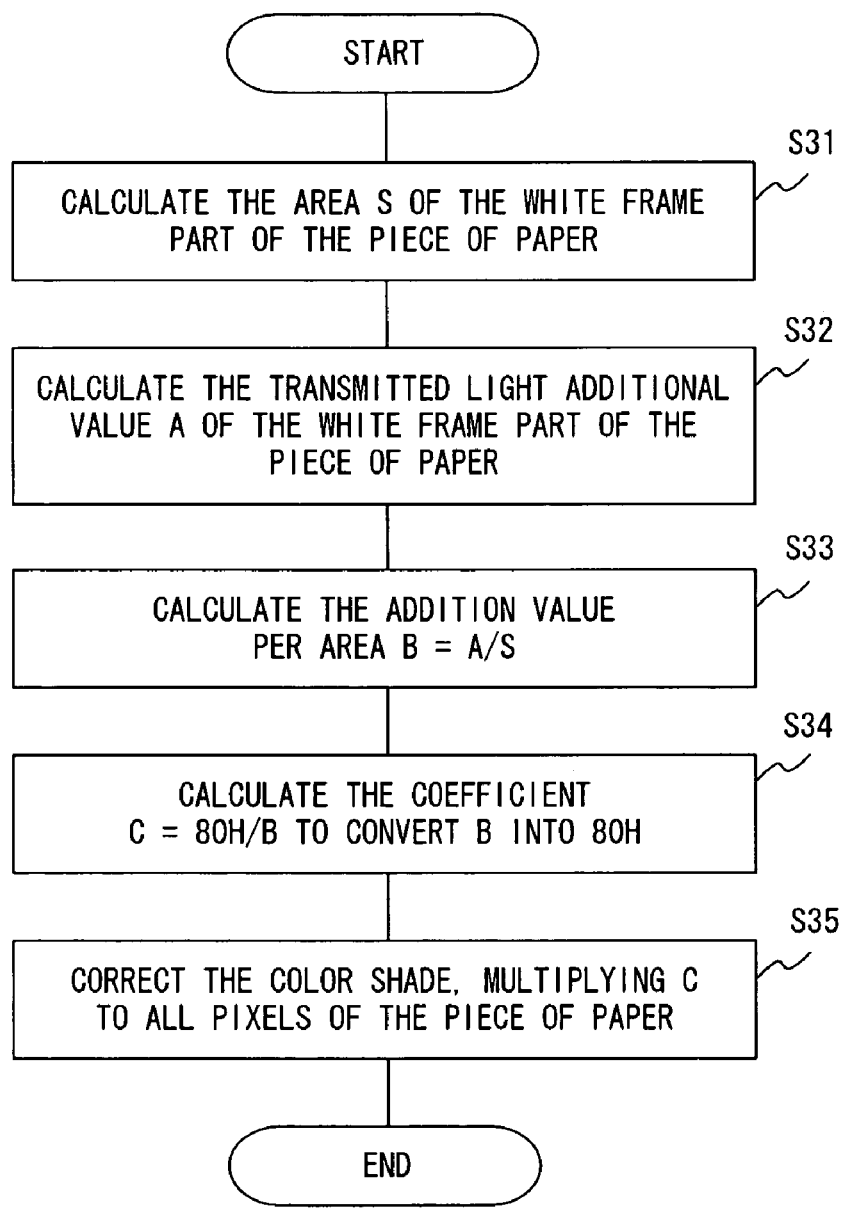
FIG. 4 is a flowchart that explains the color shade correction process in the primary preferred embodiment of the present invention.

FIG. 4 is a flowchart explaining the details of the color shade correction at Step S11 indicated in FIG. 3.

First, the area S of the white frame part of the paper-piece image data 41 is calculated (Step S31), and next the transmitted light additional value A of the white frame part is calculated (Step S32). The calculation of the transmitted light additional value B (=A/S) per the area of the white frame part follows (Step S33), and next the coefficient C (=80H/B) is calculated to convert B into 80H (H is the symbol of the hexadecimal number) (Step S34). Lastly, the all pixels of the paper-piece image data 41 are multiplied by C, and the color shade of the paper-piece image data 41 is corrected (Step S35).

Figure 5B:
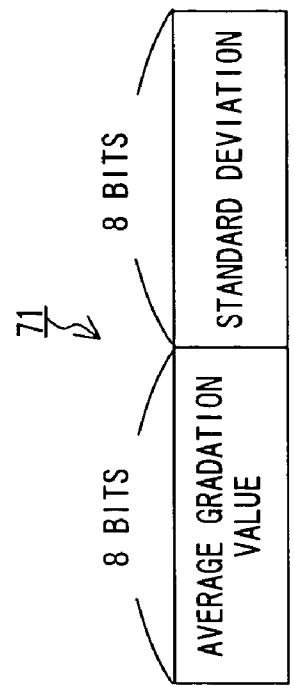
FIG. 5(*a*) is a diagram that indicates the whole data structure of the template, and (*b*) is a diagram that indicates the pixel data structure of the template.

FIG. 5 shows diagrams describing the data structure of the template 70.

Figure 5A:
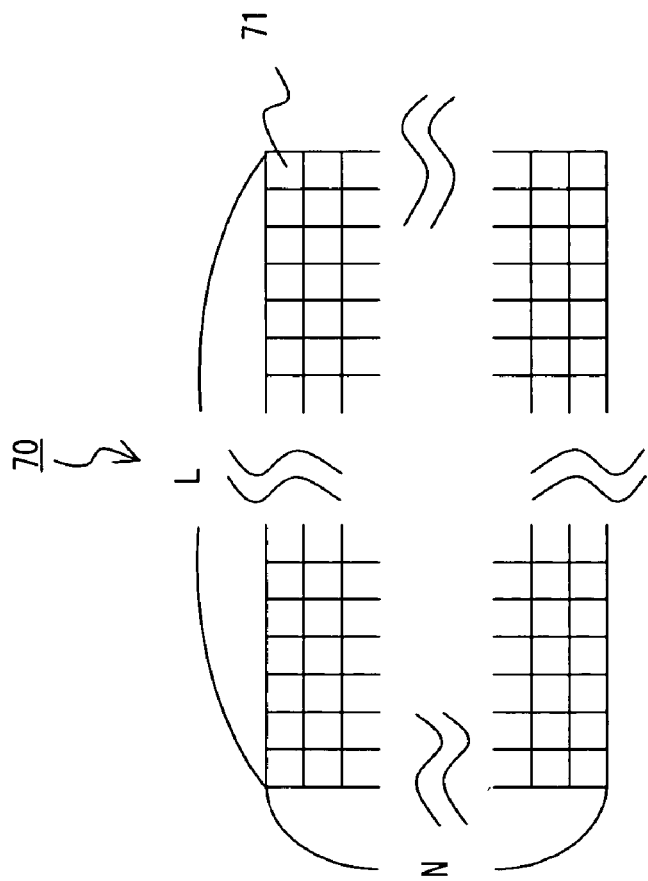

As it is indicated in FIG. 5(a), the template 70 has L columns and N rows, and consists of L×N pixels 71. As it is described in FIG. 5(b), pixels 71 is 16-bit configuration: the higher 8 bit stores the data of average value of gradation (the average value of color shade); and lower 8 bit stores the data of standard deviation σ. The standard deviation σ is the standard deviation of gradation value of pixels 71 obtained from the sample data for making the template 70.

FIG. 6 shows diagrams describing the data structure of the for-comparison banknote image data 60.

Figure 6A:
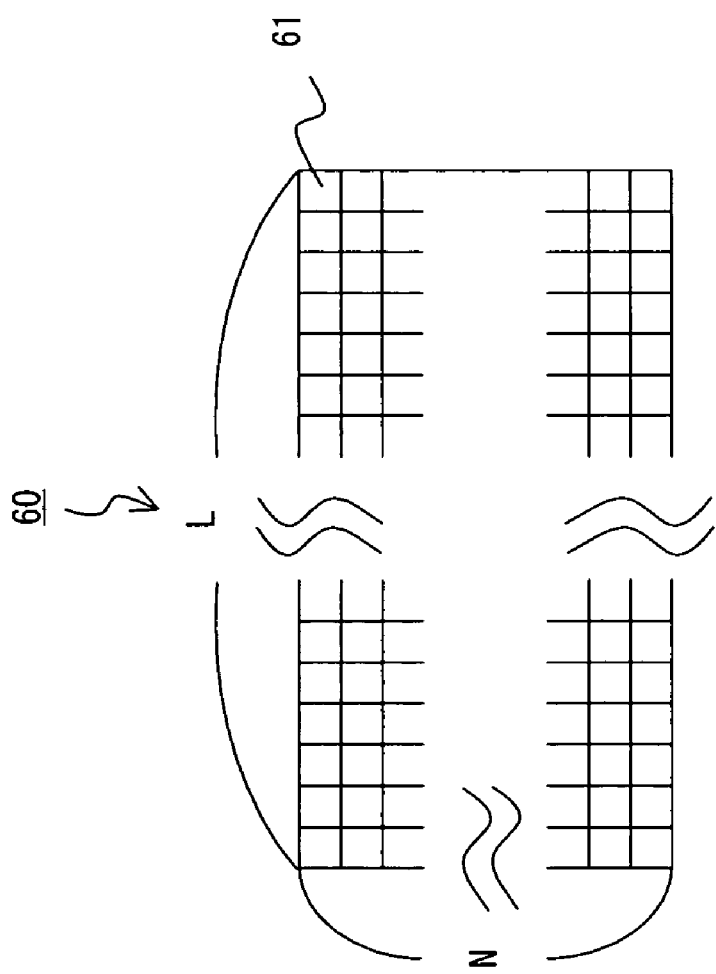
FIG. 6(*a*) is a diagram indicating the whole data structure of the for-comparison banknote image data, and (*b*) is a diagram that shows the pixel data structure of the for-comparison banknote image data.
Figure 6B:
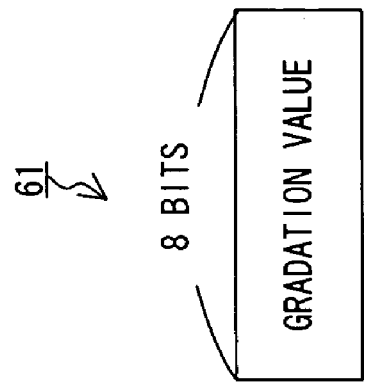

As it is indicated in FIG. 6(a), in the same way as the template 70, the for-comparison banknote image data 60 also has L columns and N rows, and consists of L×N pixels 61. As it is described in FIG. 6(b), pixels 61 is 8-bit configuration, and the data of the gradation value (color shade value) is stored within the 8 bits.

Figure 7:
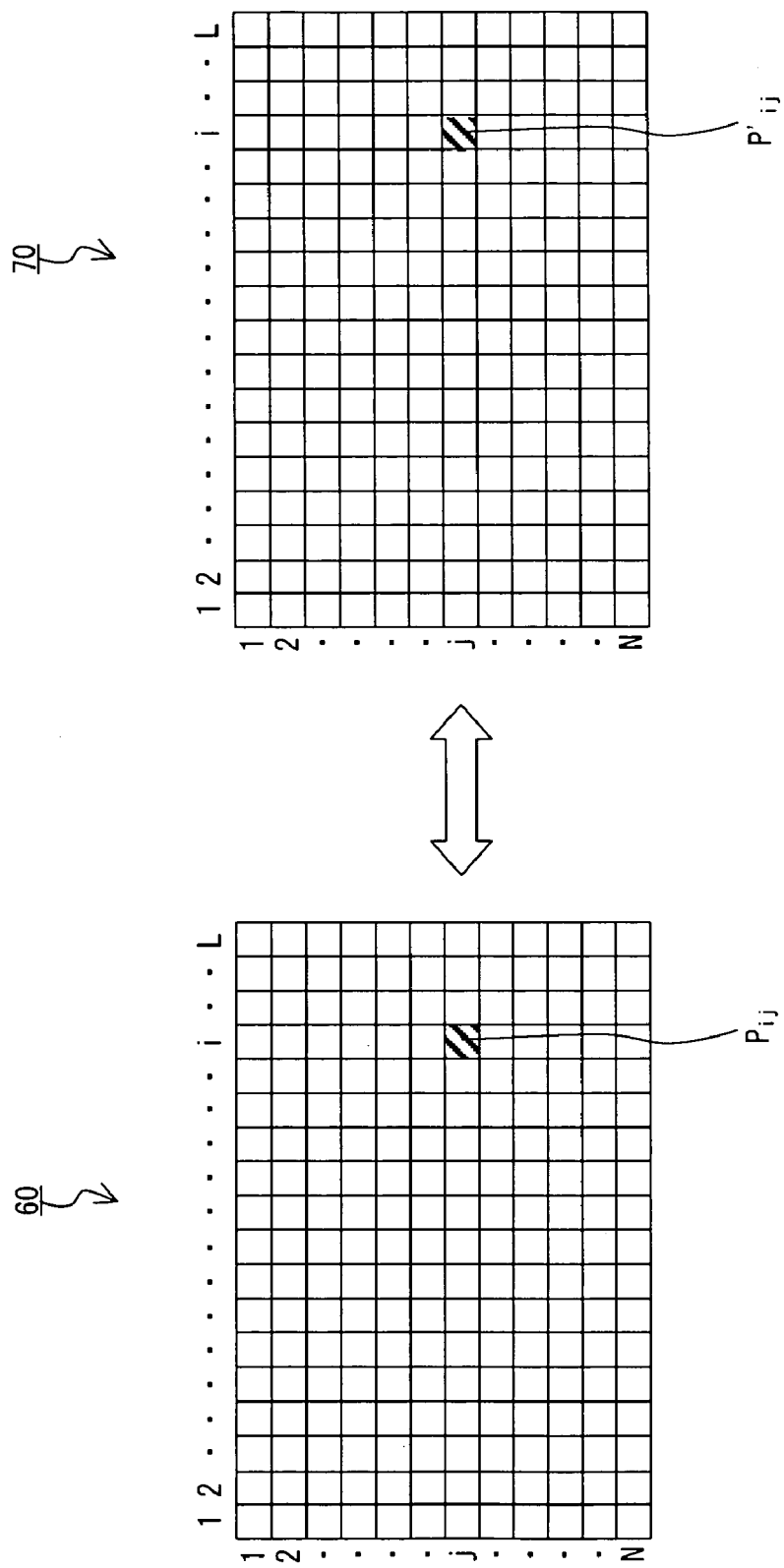
FIG. 7 is a pattern diagram that shows the pattern matching method of the for-comparison banknote image data and the template.

In the present preferred embodiments, as it is described schematically in FIG. 7, at the patter matching of the for-comparison banknote image data 60 and the template 70, Euclidean distance $d_{ij}$ between the pixels of the same position in both data is calculated using the following equation (1).

$$d_{ij}=(P_{ij}-P'_{ij})/\sigma \qquad (1)$$

$P_{ij}$: the gradation value of the pixels in the for-comparison banknote image data 60

$P'_{ij}$: the gradation value of the template 70

Next, the process of full image pattern matching in Step S14 of FIG. 3 is provided as follows.

Figure 8:
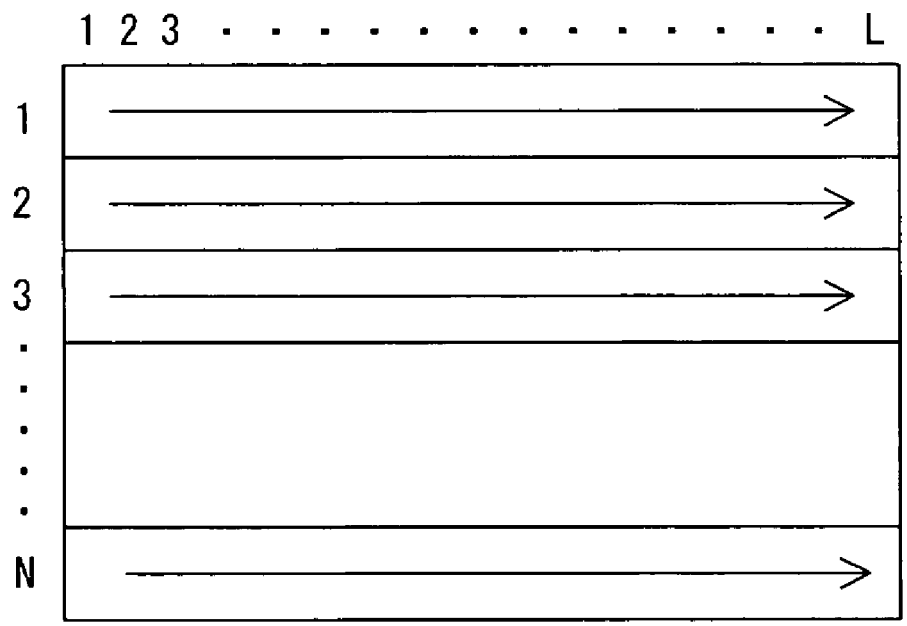
FIG. 8 is a pattern diagram that shows the pattern matching process in the full image.

FIG. 8 is a schematic drawing of the method of the pattern matching in full image. In FIG. 8, as it is indicated in the arrow pointing right, the Euclidean distance $d_{ij}$ of each row from the first row to the row N is calculated from the equation (1), and the Euclidean distance $D_{all}$ of all pixels as expressed by the following equation (2).

$$D_{all}=\Sigma\Sigma(P_{ij}-P'_{ij})/\sigma \qquad (2)$$

FIG. 9 is a flowchart explaining the details of the pattern matching process in full image at Step S14 described in FIG. 3. In FIG. 9, i and j are the variables indicating the row number and column number of the pixels respectively. Also, $D_{EA}$ is a variable to calculate the Euclidean distance in the pattern matching in full image.

First, the variable i and the variable j are substituted by 1. Also, the variable $D_{EA}$ is substituted by 0 (step S41).

Next, the Euclidean distance $d_{ij}$ is calculated with the equation (1) (Step S42) and the Euclidean distance $d_{ij}$ is added to the variable $D_{EA}$ (Step S43). It is flowed by the judgment of whether the variable i is equal to L (Step S44), and if it is not equal, the value of i is incremented by 1 (Step S45), and the process returns to Step S42.

In the manner described above, the processes of Steps S42 through S45 are repeated until when the variable i equals L is distinguished in Step S44. And the sum total of the Euclidean distance of all pixels in i rows is calculated.

When i=L is confirmed in Step S44, next j=N is to be distinguished (Step S46). If it is not j=N, the value of j is incremented by 1 (Step S47), and the process returns to Step S42. In such manner, the processes of Steps S42 through S47 are repeated until j equals N, and the sum total of Euclidean distance of all pixels in the image is calculated. The sum total is stored in $D_{EA}$. When it is distinguished that j equals N in Step S46, then, the process terminates.

FIG. 10 is a schematic drawing showing the process of the pattern matching in horizontal line image in Step S15 described in FIG. 3.

In this pattern matching, as it is described in FIG. 10, any row x in the for-comparison banknote image data 60 is selected, and the row x is scanned. The sum total of the Euclidean distance $d_{ij}$ of the all pixels in the scanning line 81 and that of the template 70 is calculated. However, the row x needs to include the pixels of the paper-piece image data 42, and it is desirable that the row x has the largest number of pixels in the paper-piece image data 42.

Figure 11:
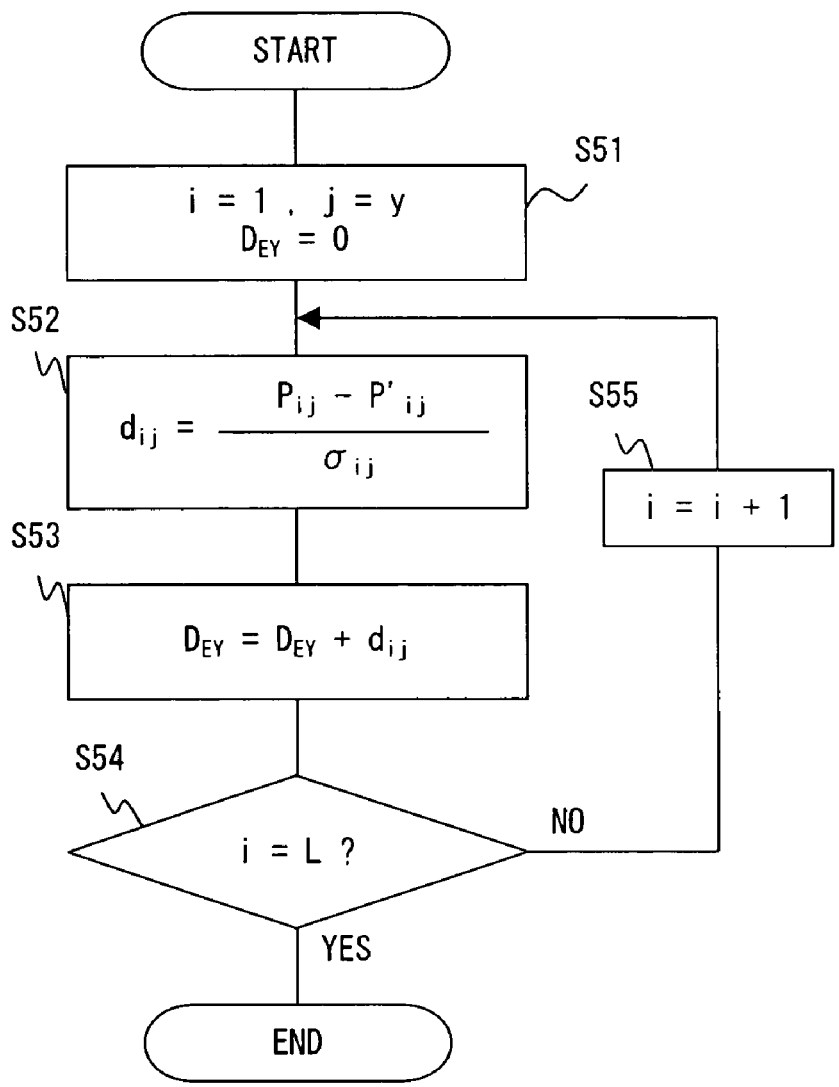
FIG. 11 is the detailed flowchart describing the pattern matching process in the horizontal line image.

FIG. 11 is a flowchart explaining the details of the process of pattern matching in horizontal line image in Step S15 described in FIG. 3. In FIG. 11, the variable i and the variable j are the variables set for the row number and the column number of pixels respectively. Also, $D_{EY}$ is the variable to calculate the sum total of the Euclidean distance of all pixels in the selected row y.

First, i is set for 1 and j is set for the selected row number y as the initial setting. Also, the initial setting of $D_{EY}$ is 0 (Step S51). And the Euclid distance $d_{ij}$ is calculated using the equation (1) (Step S52), and the calculated Euclid distance $d_{ij}$ is added to the variable $D_{EY}$ (Step S53).

Next, whether i is equal to L is distinguished (Step S54), and if it is not equal to L, the value of i is incremented by 1 (Step S55), and the process returns to Step S52.

In this manner, the processes of Steps S52 through S54 are repeated until the value of i equals L, and the sum total of the Euclidean distance for all pixels in the selected row y is calculated. The sum total is stored in $D_{EY}$. When i equals L is confirmed in Step S54, the process terminates.

FIG. 12 is a schematic drawing showing the process of the pattern matching in vertical line image in Step S16 described in FIG. 3.

In this pattern matching in vertical line image, any column x in the for-comparison banknote image data 60 is selected, and all the pixels of the column x are scanned. The sum total of the Euclidean distance $d_{ij}$ of the all pixels in the scanning line 91 and that of the template 70 is calculated. However, in this case, the column x needs to include the pixels of the paper-piece image data 42, and it is desirable that the column x has the largest number of pixels in the paper-piece image data 42.

Figure 13:
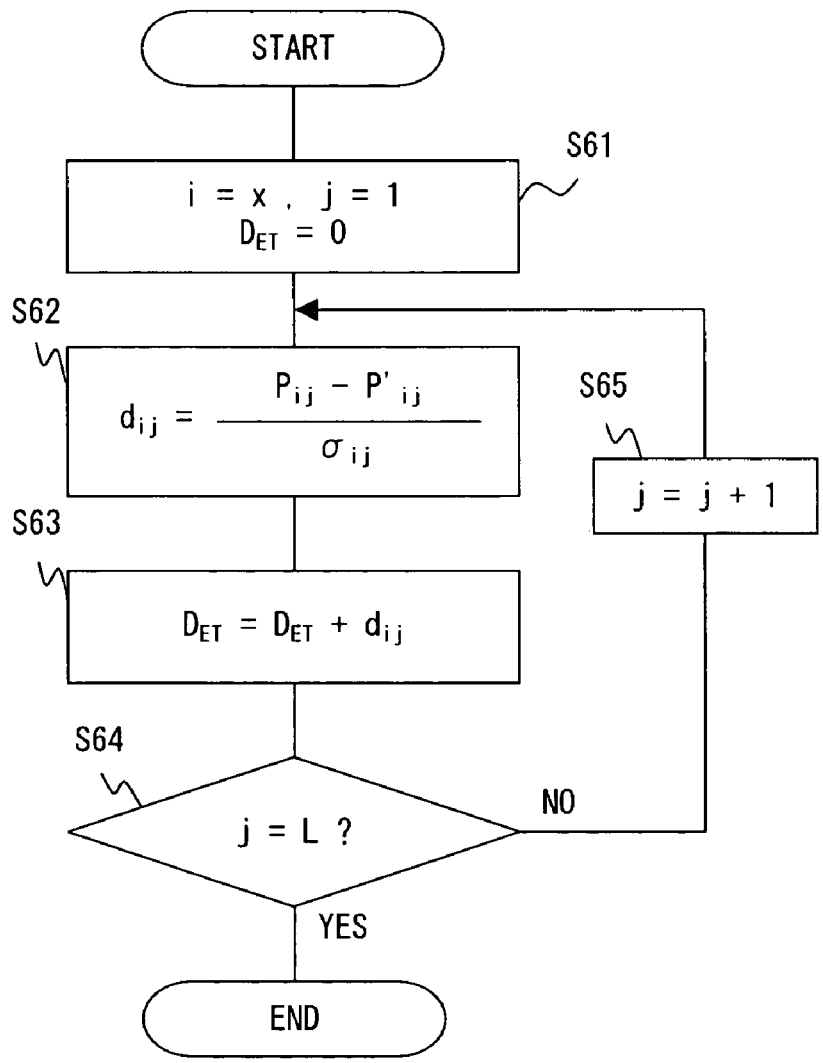
FIG. 13 is the detailed flowchart describing the pattern matching process in the vertical line image.

FIG. 13 is a flowchart explaining the details of the process of pattern matching in vertical line image in Step S16 described in FIG. 3. In FIG. 13, the variable i and the variable j are the variables set for the row number and the column number of pixels respectively.

First, i is set for the selected column number x and j is set for 1 as the initial setting. Also, the initial setting of $D_{ET}$, the variable to calculate the sum total of the Euclidean distance of all pixels in the selected column x, is 0 (Step S61).

Next, the Euclidean distance $d_{ij}$ is calculated using the equation (1) (Step S62), and the calculated Euclidean distance $d_{ij}$ is added to the variable $D_{ET}$ (Step S63). And whether j is equal to N is distinguished (Step S64), and if it is not equal to N, the value of j is incremented by 1 (Step S65), and the process returns to Step S62.

In such ways, the processes of Steps S62 through S64 are repeated until the value of j equals N, and the sum total of the Euclidean distance for all pixels in the selected column x is calculated. The sum total is stored in $D_{ET}$. When j equals N is confirmed in Step S64, the process terminates.

Figure 15:
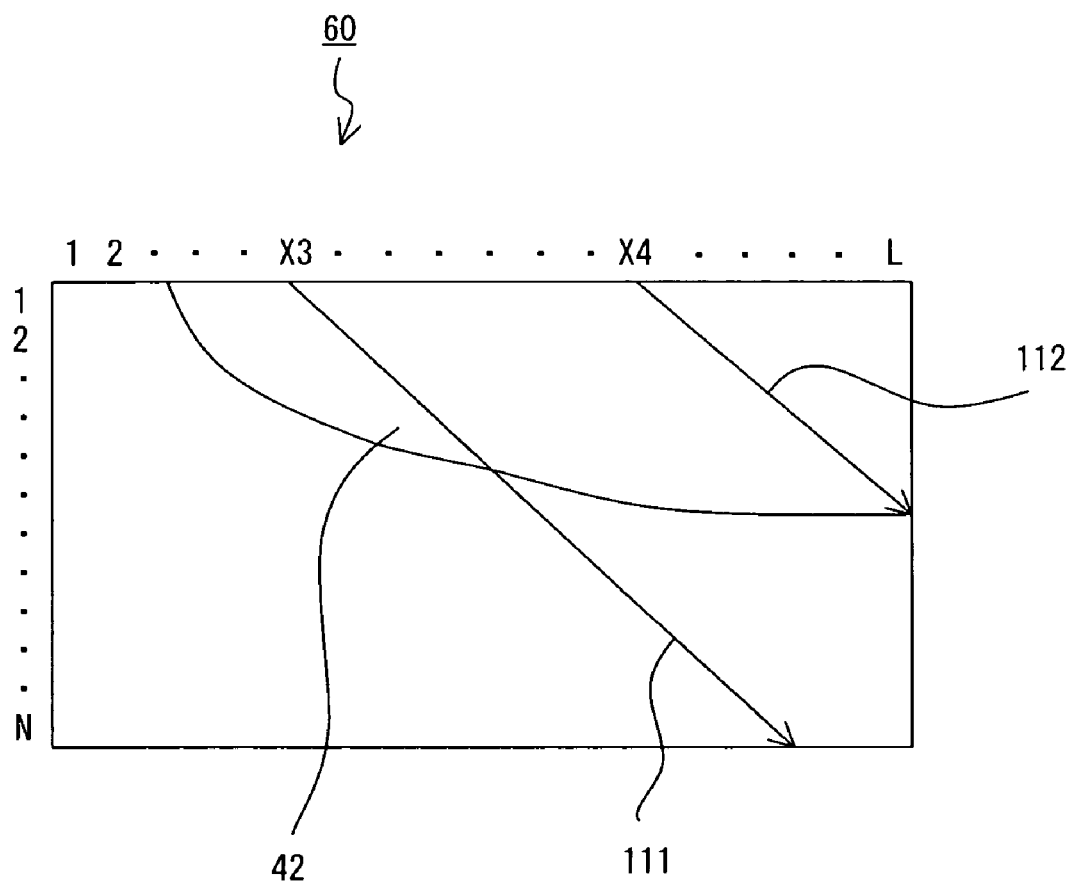
FIG. 15 is a pattern diagram of the pattern matching process in the right-oblique line image.

FIG. 14 and FIG. 15 are schematic drawings showing the process of the pattern matching in oblique line image in Step S17 described in FIG. 3.

In FIG. 14 shows the pattern matching processes in left-oblique line image. Any of the column x is selected and the pixels are scanned obliquely in left direction at a certain angle (45 degrees, for example) from the selected column. The sum total of the Euclidean distance in all pixels of the scanned oblique line is calculated. In FIG. 14, the scanning line 101 that starts from the column x1 selected from the for-comparison banknote image data 60 and the scanning line 102 that starts from the column x2 selected from the for-comparison banknote image data 60 are shown. In this method, it is desirable to select the column number so that the number of pixels of the paper-piece image data 42 on the scanning line is the largest.

On the other hand, FIG. 15 is a schematic drawing of the pattern matching process in oblique line image in which the scanning direction is set for right-oblique direction.

FIG. 15 shows the scanning line 111 with the scanning starting point of the pixel column number x3 and the scanning line 112 with the scanning starting point of the pixel column number x4. In this method, also, it is desirable to select the column number so that the scanning line scans the largest number of pixels of the paper-piece image data 42.

Figure 16:
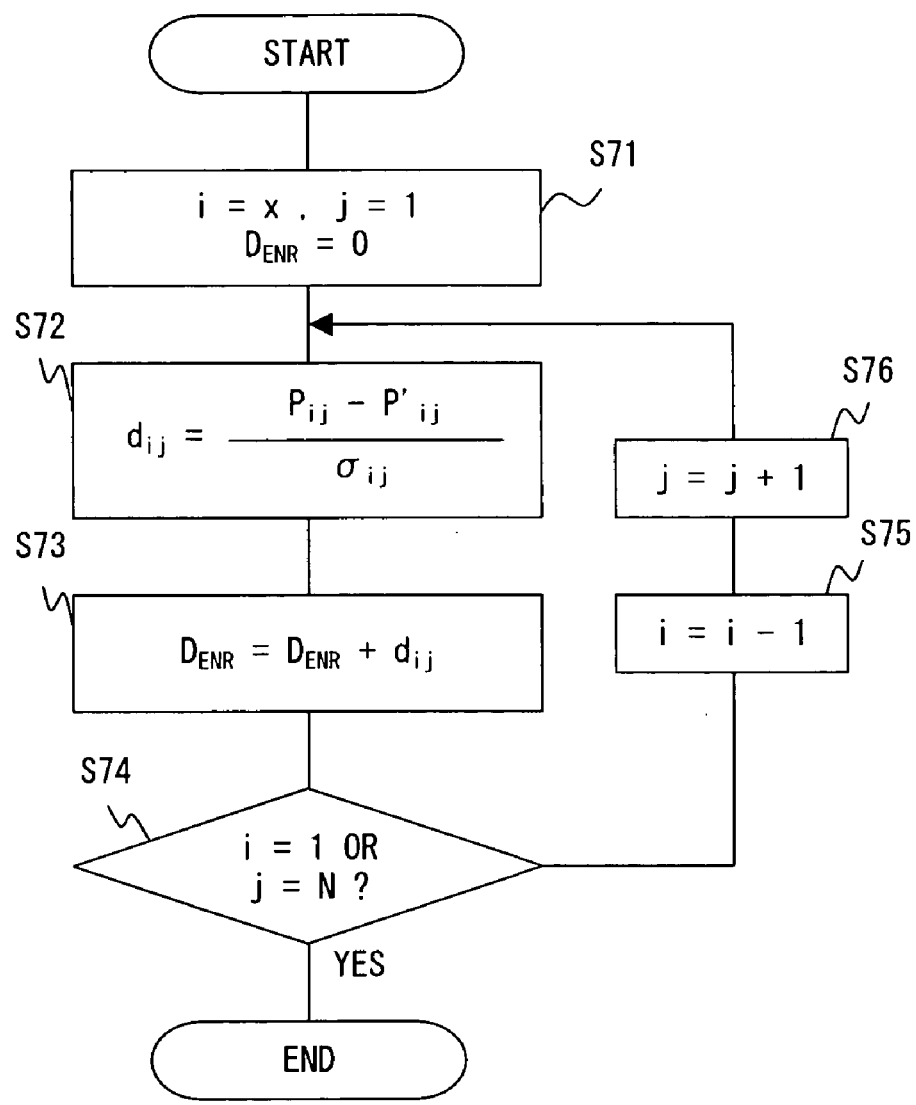
FIG. 16 is the detailed flowchart describing the pattern matching process in the left-oblique line image

FIG. 16 is a flowchart that explains the details of the process of pattern matching in oblique line image of left oblique direction described in FIG. 14. In FIG. 16, the variable i and the variable j are the variables set for the row number and the column number of pixels respectively. Also, $D_{ENR}$ is the variable used to calculate the sum total of the Euclidean distance of all pixels on the scanning line running toward left-oblique direction.

First, i is set for the number of the scanning starting column and j is set for 1 as the scanning starting row. Also, the initial setting of $D_{ENR}$ is set for 0 (Step S71).

Next, the Euclidean distance is to be found calculating with the above-mentioned equation (1) (Step S72), and the calculated Euclidean distance $d_{ij}$ is added to the variable $D_{ENR}$ (Step S73). And the establishment of either i=1 or j=N is distinguished (Step S74), and if neither i nor j meet the equations, the value of i is decremented by 1 (Step S75), the value of j is incremented by 1 (Step S76), and the process returns to Step S72.

In such manner, the processes of Steps S72 through S76 are repeated until the establishment of either i=1 or j=N is confirmed, and the sum total of the Euclidean distance for all pixels of the line image scanned in left-oblique direction from the scanning starting column x of the first row is calculated. The sum total is stored in $D_{ENR}$. When the establishment of either i=1 or j=N is confirmed in Step S74, the process terminates.

Figure 17:
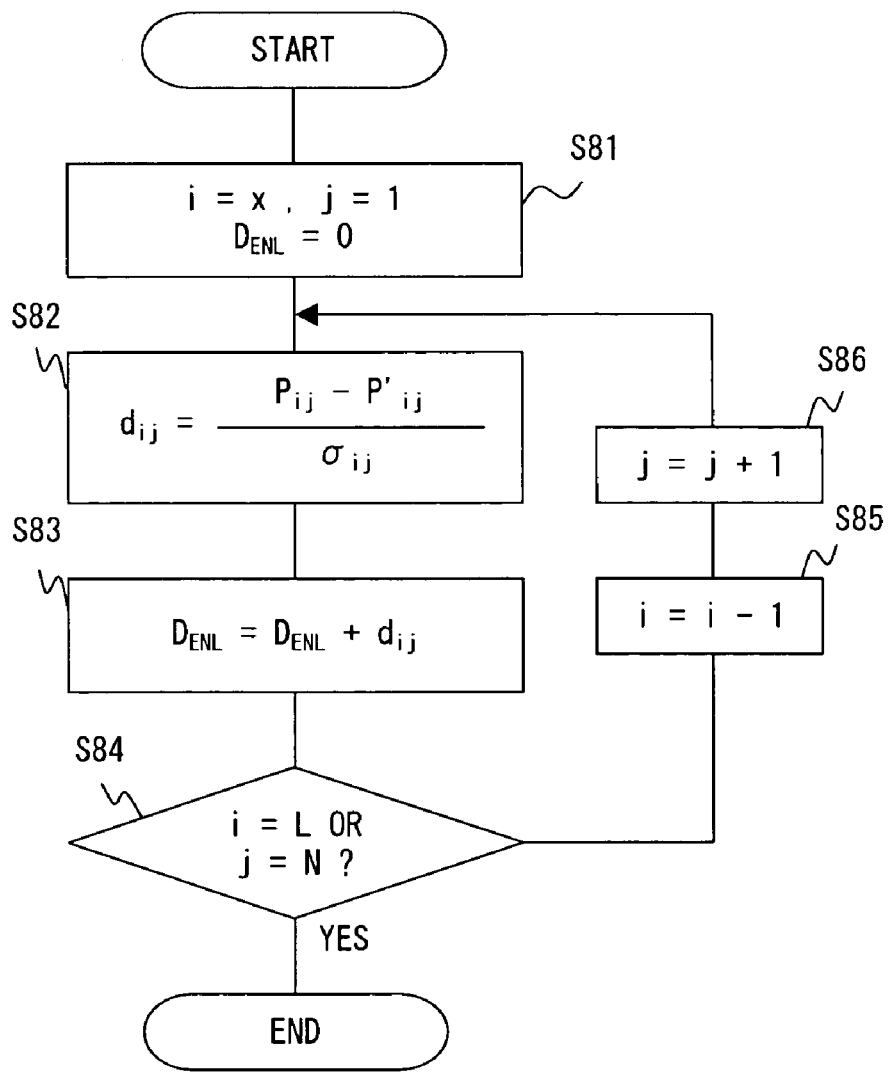
FIG. 17 is the detailed flowchart describing the pattern matching process in the right-oblique line image.

FIG. 17 is a flowchart that explains the details of the process of pattern matching in oblique line image of right oblique direction described in FIG. 15.

First, i is set for the column number of the scanning starting pixel (=x) and j is set for the scanning starting row (=1). Also, the initial setting of $D_{ENL}$, the variable used to calculate the sum total of the Euclidean distance of all pixels in the scanning line image running toward right-oblique direction, is set for 0 (Step S81).

Next, the Euclidean distance is to be found calculating with the above-mentioned equation (1) (Step S82), and the calculated Euclidean distance $d_{ij}$ is added to the variable $D_{ENL}$ (Step S83). And the establishment of either i=L or j=N is distinguished (Step S84), and if neither i nor j meet the equations, the value of i is incremented by 1 (Step S85), the value of j is decremented by 1 (Step S86), and the process returns to Step S82.

In this way, the processes of Steps S82 through S86 are repeated until the establishment of either i=L or j=N is confirmed, and the sum total of the Euclidean distance for all pixels of the line image scanned on the selected scanning line in right-oblique direction is calculated. The sum total is stored in $D_{ENL}$. When the establishment of either i=L or j=N is confirmed in Step S84, the process terminates.

In addition, in the primary preferred embodiments, as a part of the for-comparison banknote image data 60, the pattern matching method is applied to the data of one vertical line, one horizontal line, one left-oblique line, and one right-oblique line. However, the line scanned can be a plural number of lines. Also, the part of the for-comparison banknote image data 60 used for the pattern matching in the present invention is not limited to be line-shaped. As long as the data includes a part of the paper-piece image data 42 of the for-comparison banknote image data 60, the part of the for-comparison banknote image data 60 can have a shape other than a line.

{The Secondary Preferred Embodiments}

Figure 18:
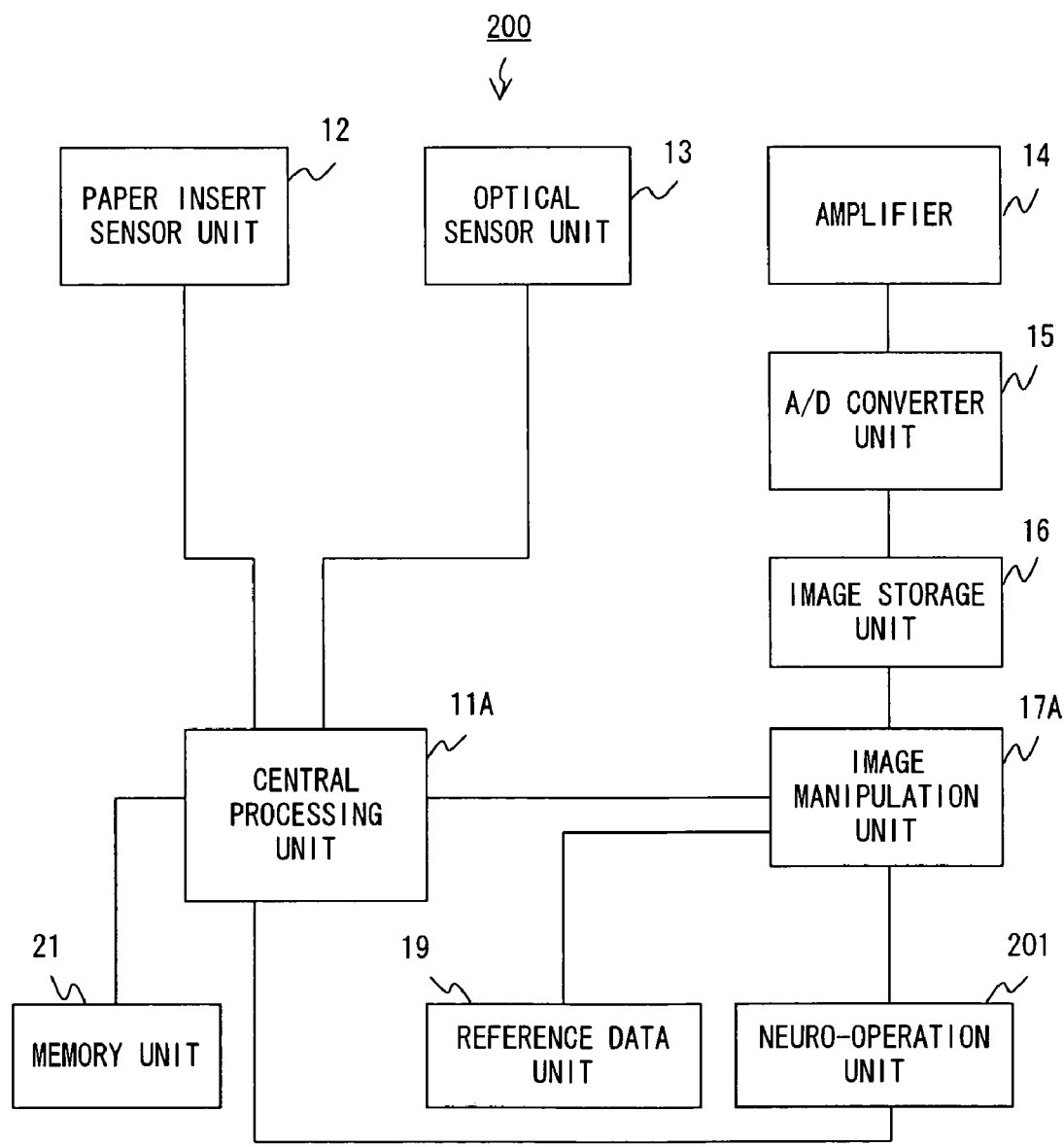
FIG. 18 is a block diagram indicating the system configuration of paper discrimination device that is the secondary preferred embodiment of the present invention.

FIG. 18 is a block diagram showing the system configuration of the paper-piece discrimination device 200 of the secondary preferred embodiment of the present invention. In FIG. 18, the same components, which the paper-piece discrimination device 10 of the primary preferred embodiment shown in FIG. 1 has, are given the same number as in FIG. 1 and the description of these components are omitted.

The difference in the configuration between paper-piece discrimination device 200 and the paper-piece discrimination device 10 is that the image manipulation unit 17A, the reference data unit 19 and the neuro-operation unit 201 substitute the functions of paper-piece discrimination by the template comparison unit 18, the reference data unit 19 and the template unit 20. Also, the central processing unit 11A discriminates the denomination of the paper-piece by analyzing the output of the neuro-operation unit as well as the unit controls the image manipulation unit 17A.

The image manipulation unit 17A, as it is stated above, corrects the color shade of the paper-piece image data 42 and regularizes it. Then, in the same way as the template comparison unit 18, the image manipulation unit 17A makes the for-comparison banknote image data 60 from the paper-piece image data 42 and the reference data of each denomination, stored in the reference data unit 19. The size of the banknote image data from comparison 60 is, then, reduced, and all the pixels or a part of pixels of the reduced image that went through the size-reducing process are outputted to the neuro-operation unit 201.

The neuro-operation unit 201 is a neural network that inputs the above-mentioned size-reduced image made in the image manipulation unit 17A as an input pattern, and outputs the denomination of the paper-piece and its corner direction (the position of the original banknote) as an output pattern.

Incidentally, in this secondary preferred embodiment, the neuro-operation unit 201 performs the neuro-operation using the reduced-size image, however, the size of the image does not have to be reduced. Whether the reduced-size image is used as the input pattern should be decided depending on the size and the processing time of the neuro-operation unit 201.

Figure 19:
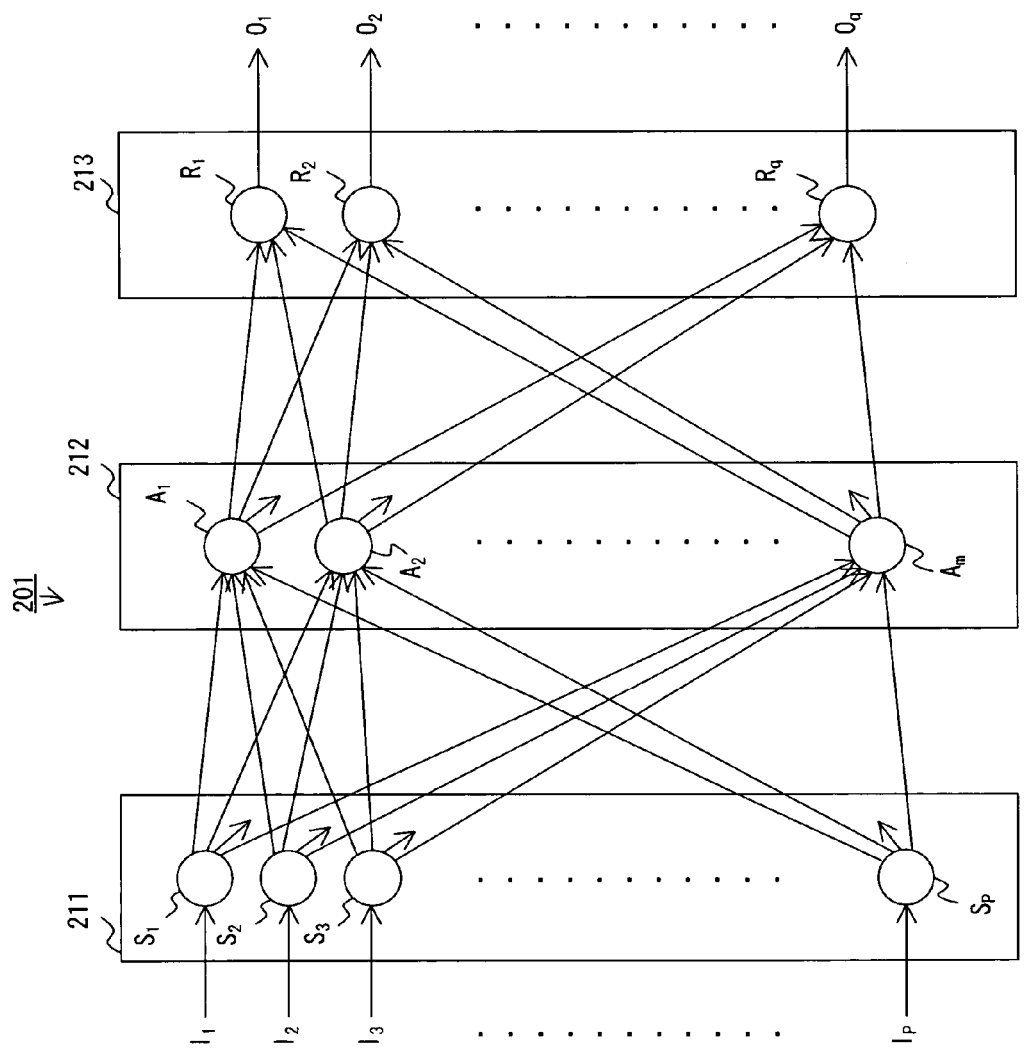
FIG. 19 is a diagram indicating the structure of the neuo-operation unit.

FIG. 19 is a diagram showing the structure of the neuro-operation unit 201.

The neuro-operation unit 201 is the feedforward-combined type neural network consisting of the input layer 211, the middle layer 212 and the output layer 213, and uses the backpropagation learning as its learning algorithm.

In the input layer 211, the input signals $I_1, I_2, \ldots, I_p$ are inputted as the input pattern from the image manipulation unit 17A. These input signals $I_i$ are the gradation value (color shade) of the pixels in the above-explained reduced size image. The input layer 211 consists of p number of unit (neuron) $S_1, S_2, \ldots, S_p$, and the input signal $I_i$ is inputted in the unit $S_i$ (i=1, 2, ..., p).

The middle layer 212 consists of m numbers of unit $A_1, A_2, \ldots, A_m$. each unit $A_j$ (j=1, 2, ..., m) is connected to the all units of $S_i$ (i=1, 2, ..., n) in the input layer 211.

Output layer 213 consists of q numbers of unit $R_1, R_2, \ldots, R_q$, and each unit is connected to all units of $R_k$ (k=1, 2, ..., q) in the middle layer 212. unit $R_k$ outputs the output signal $O_k$. This output signal $O_k$ is a binary signal of either 0 or 1, and only one unit among the q numbers of unit $R_k$ outputs the output signal of 1 and the other units output 0.

Each of q numbers of unit $R_k$ corresponds to a specific denomination and the position (direction) of the piece of paper, and outputs the output signal $O_k$ depending on the input pattern I $(I_1, I_2, \ldots, I_p)$ in the input unit 211.

Figure 20:
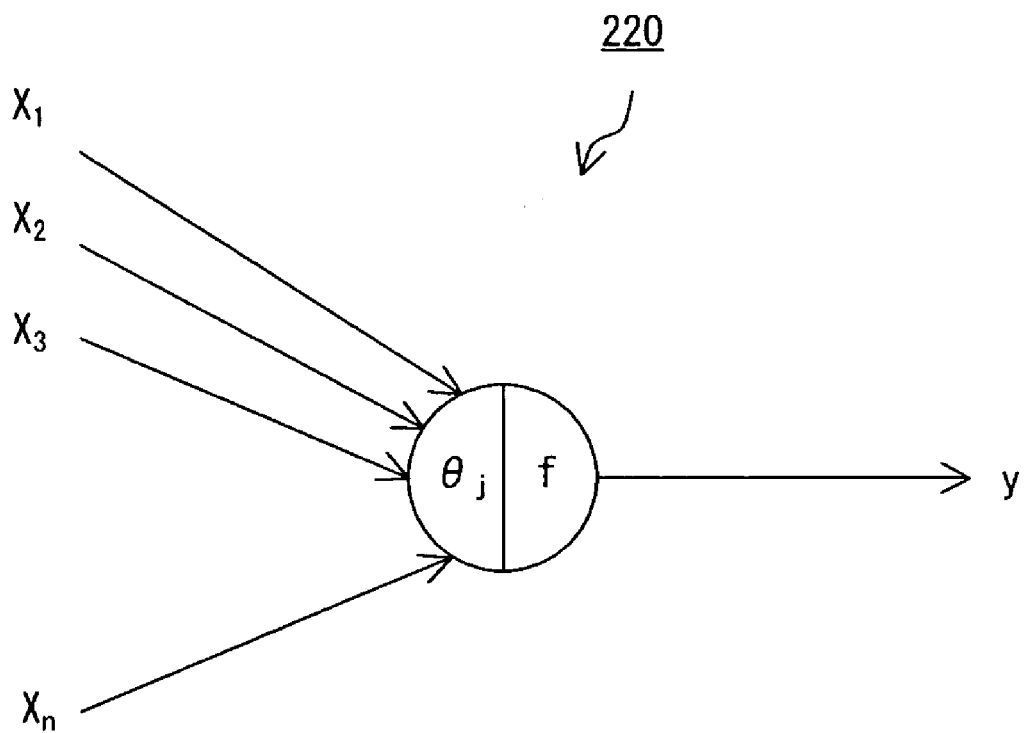
FIG. 20 is a diagram explaining the structure of units in the neuro-operation unit.

FIG. 20 is a diagram showing a model example of both the unit $A_j$ of the middle layer 212 and the unit $R_k$ of the output layer 213.

Figure 21:
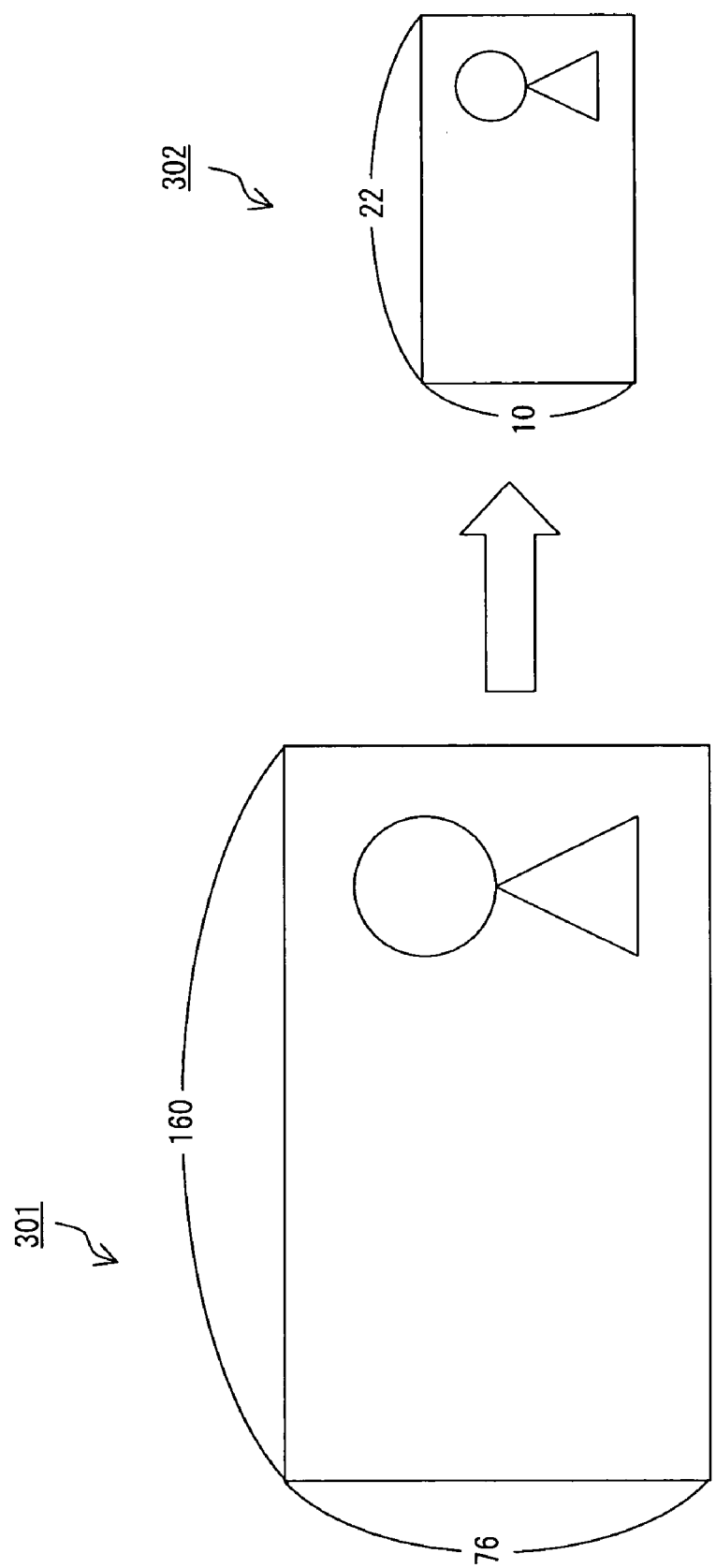
FIG. 21 is a diagram explaining the data input to the neuro-operation unit.

The unit 220 (unit j) shown in FIG. 21 is a quasi-linear device model to which input $x_i$, the output from each unit i in the previous layer, is given, and has threshold $\theta_j$. Here, the internal condition/status $u_j$ is calculated with the following equation.

$$u_j = \Sigma w_{ij} x_i + \theta_i \qquad (3)$$

$w_{ij}$: the weight of the connection between the unit i and the unit j

The output of the unit 220 is the function f ($u_j$) having the value of $u_j$ as the variable. By using a sigmoid function, for example, f ($u_j$) is expressed as the following.

$$f(u_j)=1/(1+\exp(-u_j/T)) \quad (4)$$

In this equation (4), T represents a parameter called temperature.

FIG. 21 is a diagram explaining the input pattern, which is outputted from the image manipulation unit 17A to the neuro-operation unit 201.

The image data shown in the right side of FIG. 21 is the for-comparison banknote image data 301 that is made by the image manipulation unit 17A, and its size is 76 line×160 pixels. The image manipulation unit 17A reduces the size of this banknote image data from comparison 301 and makes the size-reduced data 302 as it is shown in the left side of FIG. 21.

In the neuro-operation unit 201, one pixel of this size-reduced data 302 is inputted as one input signal. By the neuro-operation the neuro-operation unit 201 follows four kinds of pattern recognition processes of (1) pattern recognition in full image, (2) pattern recognition in horizontal line image, (3) pattern recognition in vertical line image, and (4) pattern recognition in oblique line image. The image manipulation unit 17A outputs the input signals (input patterns) needed for each of the above-mentioned pattern recognition (1) through (4) to the neuro-operation unit 201.

In the secondary preferred embodiments, the structure of the neural network 201 of the neuro-operation unit 201 changes depending on each of the above-mentioned pattern recognition (pattern matching) (1) through (4):

(1) Pattern recognition in full image
  Input signal: $I_1 \sim I_{220}$
  The number of units in input layer 211: 220
  The number of units in middle layer 212: 10
  The number of units in output layer 213: 64
  Output signal: $O_1 \sim O_{64}$ (2) Pattern recognition in horizontal line image
  Input signal: $I_1 \sim I_{22}$
  The number of units in input layer 211: 22
  The number of units in middle layer 212: 2
  The number of units in output layer 213: 64
  Output signal: $O_1 \sim O_{64}$ (3) Pattern recognition in vertical line image
  Input signal: $I_1 \sim I_{10}$
  The number of units in input layer 211: 10
  The number of units in middle layer 212: 3
  The number of units in output layer 213: 64
  Output signal: $O_1 \sim O_{64}$ (4) Pattern recognition in oblique line image (right-oblique or left-oblique)
  Input signal: ($I_1 \sim I_2$), ($I_1 \sim I_3$), . . . , or ($I_1 \sim I_{10}$)
  The number of unit in input layer 211: 2~10
  The number of unit in middle layer 212: 2
  The number of unit in output layer 213: 64
  Output signal: $O_1 \sim O_{64}$ As it is explained above, the number of units in the input layer 211 equals to the number of input signal $I_i$ (the number of pixels) from the image manipulation unit 17A. Also, because the gradation value (color shade) of pixels in the present preferred embodiments is 8 bits, the range of each input signal $I_1$ is 00H~FFH when it is expressed in hexadecimal number.

In addition, in the present preferred embodiments, the assumption is made that there are sixteen kinds of denominations and four directions of the position (on the original banknote) of the piece of paper (the upper-left corner, the upper-right corner, the lower-left corner, and the lower-right corner of the banknote). Therefore, the combination of the denominations and the positions (directions) of the piece of paper provides the forty-six kinds of recognition. Each of these forty six kinds of recognition corresponds to each of the output signal $O_k$ (k=1~64) of the output layer 213 where the output signal $O_k$ corresponding to recognized combination (the denomination and direction (position) of the piece of paper) is assigned as 1.

From FIG. 22 to FIG. 26 are the diagrams explaining the input signals in each of the above-mentioned (1) through (4) pattern recognitions.

Figure 23:
FIG. 23 is a diagram explaining the input pattern when the neuro-operation unit recognizes the vertical line image pattern.

As it is shown in FIG. 22, in the pattern recognition in full image, the gradation value (color shade) of all pixels of the reduced-size data 302 is inputted to the neural network 201 as the input signal $I_1 \sim I_{220}$. Also, in the pattern recognition in horizontal line image, as it is shown in FIG. 23, the gradation value (color shade) of all the pixels in one of any column (shaded part) in the reduced-size data 302 is inputted to the neural network 201 as the input signal $I_1 \sim I_{22}$. Moreover, in the pattern recognition in the vertical line image, as it is shown in FIG. 24, the gradation value (color shade) of all the pixels in one of any row (shaded part) in the reduced-size data 302 is inputted to the neural network 201 as the input signal $I_1 \sim I_{10}$.

Figure 25:
FIG. 25 is a diagram explaining the input pattern when the neuro-operation unit recognizes the left-oblique line image pattern.

As for the pattern recognition in oblique line image, particularly in the pattern recognition of the left-oblique line image, as it is shown in FIG. 25, the gradation value (color shade) of each pixel in left-oblique line with two to ten pixels, which starts from the pixel at the first row of any column (dotted part) in the reduced-size data 302 is inputted to the neural network 201 as the input signal $I_1 \sim I_2, \ldots$, the input signal $I_1 \sim I_{10}$. Also, in the case of the pattern recognition of the right-oblique line image, as it is shown in FIG. 26, the gradation value (color shade) of each pixel in right-oblique line with two to ten pixels, which starts from the pixel at the first row of any column (dotted part) in the reduced-size data 302 is inputted to the neural network 201 as the input signal $I_1 \sim I_2$ to the input signal $I_1 \sim I_{10}$.

Figure 27:
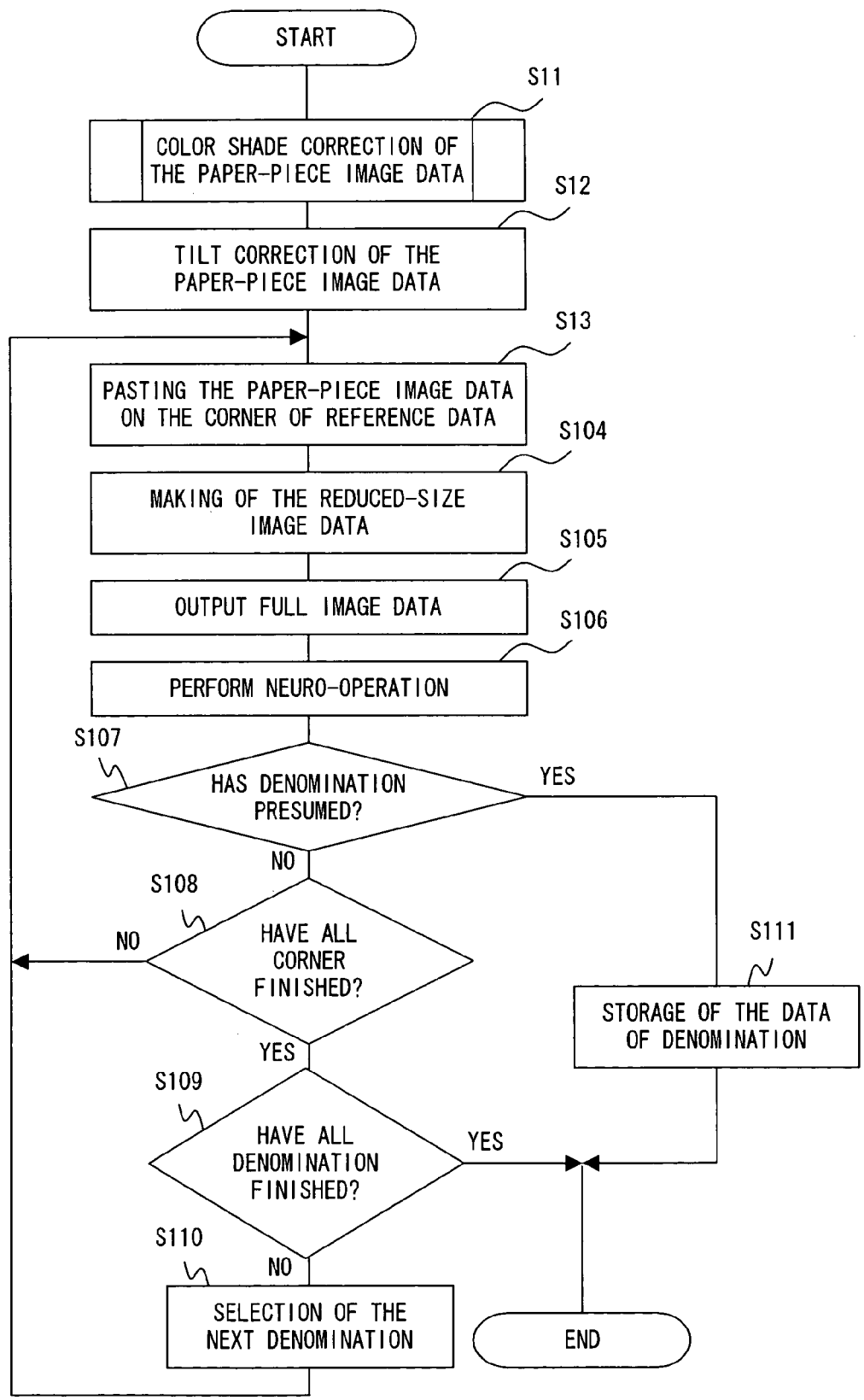
FIG. 27 is a flowchart explaining the process that the paper discrimination device of the secondary preferred embodiments recognizes the image pattern by the neuro-operation and discriminates the denominations of the piece of paper.

FIG. 27 is a flowchart explaining the performance of paper-piece discrimination device 200 that discriminates the denominations of the piece of paper by the pattern recognition in full image. In FIG. 27, the steps, which have the same process as the steps in the flowchart of FIG. 3 are given the same step number as the steps in FIG. 3.

The image manipulation unit 17A corrects the color shade to the paper-piece image data outputted from the image storage unit 16 (Step S11), and regularizes the paper-piece image data 42 by applying the tilt correction (Step S12). The image manipulation unit 17A, then, produces the for-comparison banknote image data 301 by pasting the paper-piece image data 42 onto the corner, which is selected as the first corner, of the template 70 of the denomination selected as the first denomination to examine (Step S13). The denomination and the corner (position) selected to be the first are determined in advance.

Next, the image manipulation unit 17A makes the reduced-size data 302 from the above-mentioned for-comparison banknote image data 301 (Step S104), and outputs the full image data (all pixels) of the reduced-size data 302 to the neuro-operation unit 201 (Step S105).

The neuro-operation unit 201 inputs the full image data as the input pattern, performs the neuro-operation, and outputs the output pattern corresponding to its input pattern (Step S106).

The central processing unit 11A inputs the output pattern from the neuro-operation unit 201, and judges whether the denomination is presumed by the neuro-operation unit 201 (Step S107). If the denomination has not been presumed, the central processing unit 11A judges whether pasting of the paper-piece image data 42 has been finished on every corner of the reference data 50 of currently selected denomination (Step S108). If the pasting on every corner has not been finished, the process returns to Step S13.

If the central processing-unit 11A judges that the denomination has been presumed, on the other hand, the data of the denomination is stored in the memory unit 21 (Step S111), and the process is terminated.

In this manner, the for-comparison banknote image data 301 is made by pasting the paper-piece image data 42 successively on every corner of the reference data 50, and the denomination is presumed from the reduced-size data 302 made from the for-comparison banknote image data 301 by the calculation of the neuro-operation unit 201. And after confirming that the denomination of the for-comparison banknote image data 301, that is the paper-piece image data 42 pasted on every corner of the reference data 50 of the currently selected denomination, has been presumed by the neuro-operation unit 201 in Step S108, it is distinguished whether all the denominations of the reduced-size data 302 from the for-comparison banknote image data 301 have been examined by the neuro-operation unit 201 (Step S109). If it is judged that not all the denominations have been examined, the next denomination is selected (Step S110), and the process returns to S13.

In such way, the for-comparison banknote image data 60 of every corner for each denomination is made, and each piece of reduced-size data 302 has its denomination examined by the full-image pattern recognition in the neuro-operation unit 201. When the denomination and the direction of the piece of paper are discriminated, the result data is stored in the memory unit 21. Also, when the denomination of the for-comparison banknote image data 60 cannot be presumed after examining all the denominations and all the directions by the neuro-operation unit 201, it is judged in Step S109 that all the denominations have been examined by the neuro-operation unit 201, and the whole process is to be terminated.

Figure 28:
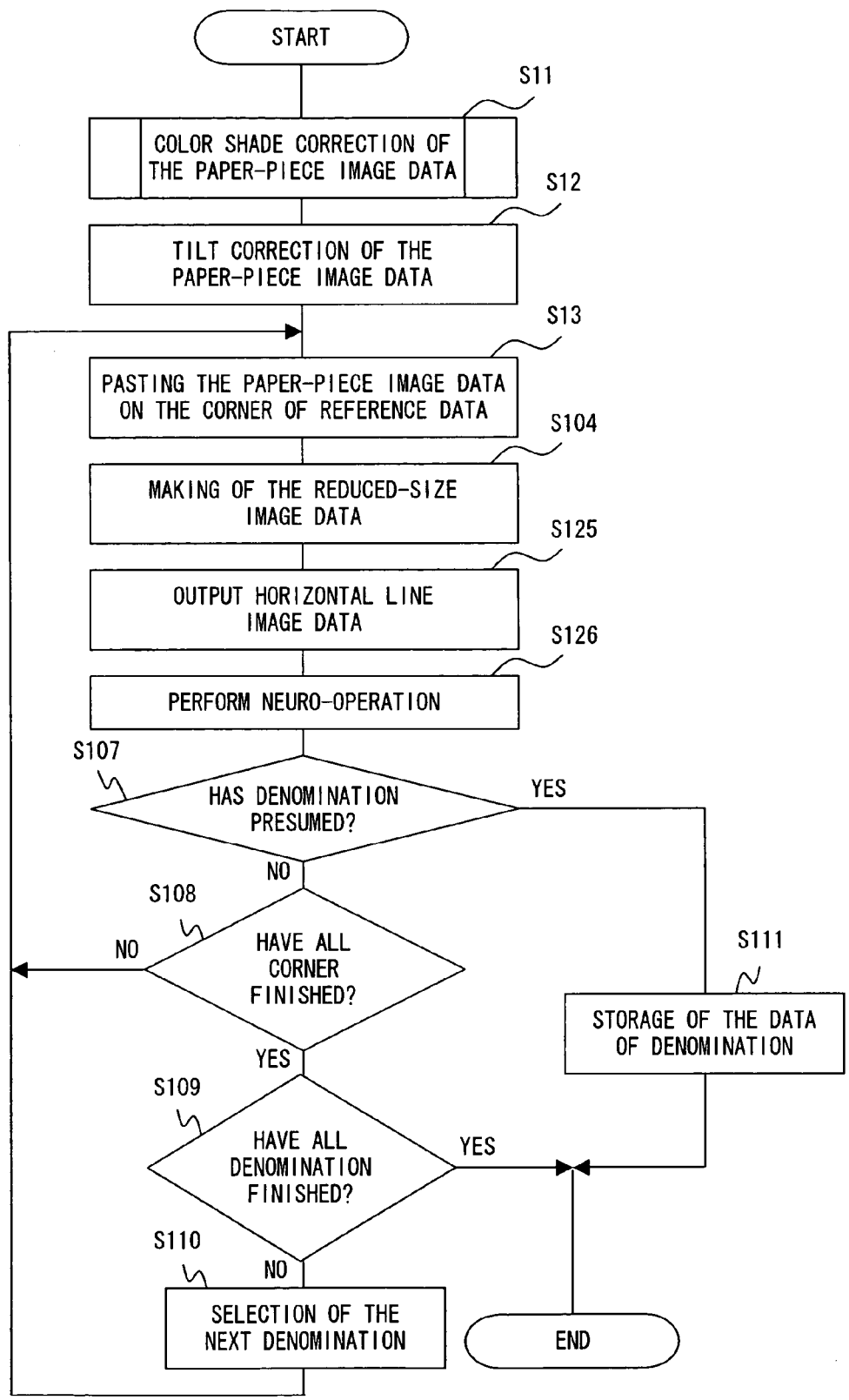
FIG. 28 is a flowchart explaining the process that the paper discrimination device of the secondary preferred embodiments recognizes the horizontal line image pattern by neuro-operation and discriminates the denominations of the piece of paper.

FIG. 28 is a flowchart explaining the performance of paper-piece discrimination device 200 that discriminates the denomination of the piece of paper by the pattern recognition in horizontal line image. In FIG. 28, the steps, which have the same process as those of FIG. 27 are given the same number as in FIG. 27, and the explanation for those steps, are omitted.

In the pattern recognition in horizontal line image by neuro-operation, the image manipulation unit 17A makes the reduced-size data 302 (Step S104), and outputs any of the horizontal line images (the line including the paper-piece image data 42) of the reduced-size data 302 to the neuro-operation unit 201 (Step S125).

The neuro-operation unit 201 inputs the horizontal line image as the input pattern, and outputs the output pattern, which corresponds to the input pattern to the central processing unit 11 (Step S126). The central processing unit 11 discriminates the denomination and direction of the piece of paper by analyzing the output pattern. Except for the steps mentioned above, the pattern recognition in horizontal line image has the same steps as that in full image as they are explained in FIG. 27.

Figure 29:
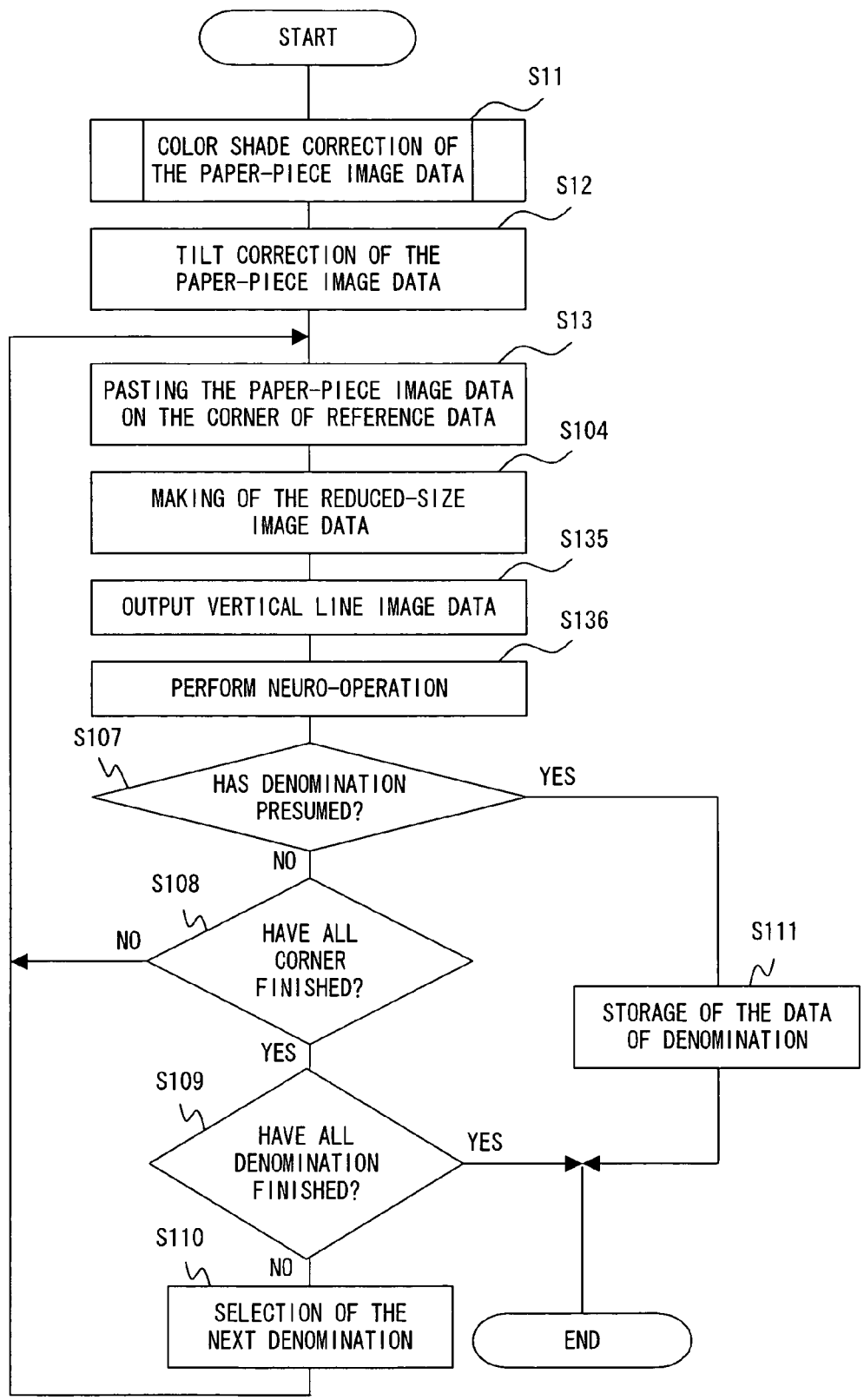
FIG. 29 is a flowchart explaining the process that the paper discrimination device of the secondary preferred embodiments recognizes the vertical line image pattern by neuro-operation and discriminates the denominations of the piece of paper.

FIG. 29 is a flowchart that explains the performance of paper-piece discrimination device 200 that discriminates the denomination of the piece of paper by the pattern recognition in vertical line image. In FIG. 29, the steps, which have the same process as those of FIG. 28 are given the same number as in FIG. 28, and the explanation for those steps, are omitted.

The image manipulation unit 17A makes the reduced-size data 302 (Step S104), and outputs any of the vertical line images (the line including the paper-piece image data 42) of the reduced-size data 302 to the neuro-operation unit 201 (Step S135). The neuro-operation unit 201 inputs the vertical line image as the input pattern, and outputs the output pattern, which corresponds to the input pattern to the central processing unit 11 (Step S136). The central processing unit 11 analyzes the output pattern and judges whether the denomination and direction of the piece of paper are presumed. When those are presumed, the data of the denomination and the direction of the banknote is stored in the memory unit 21.

Figure 30:
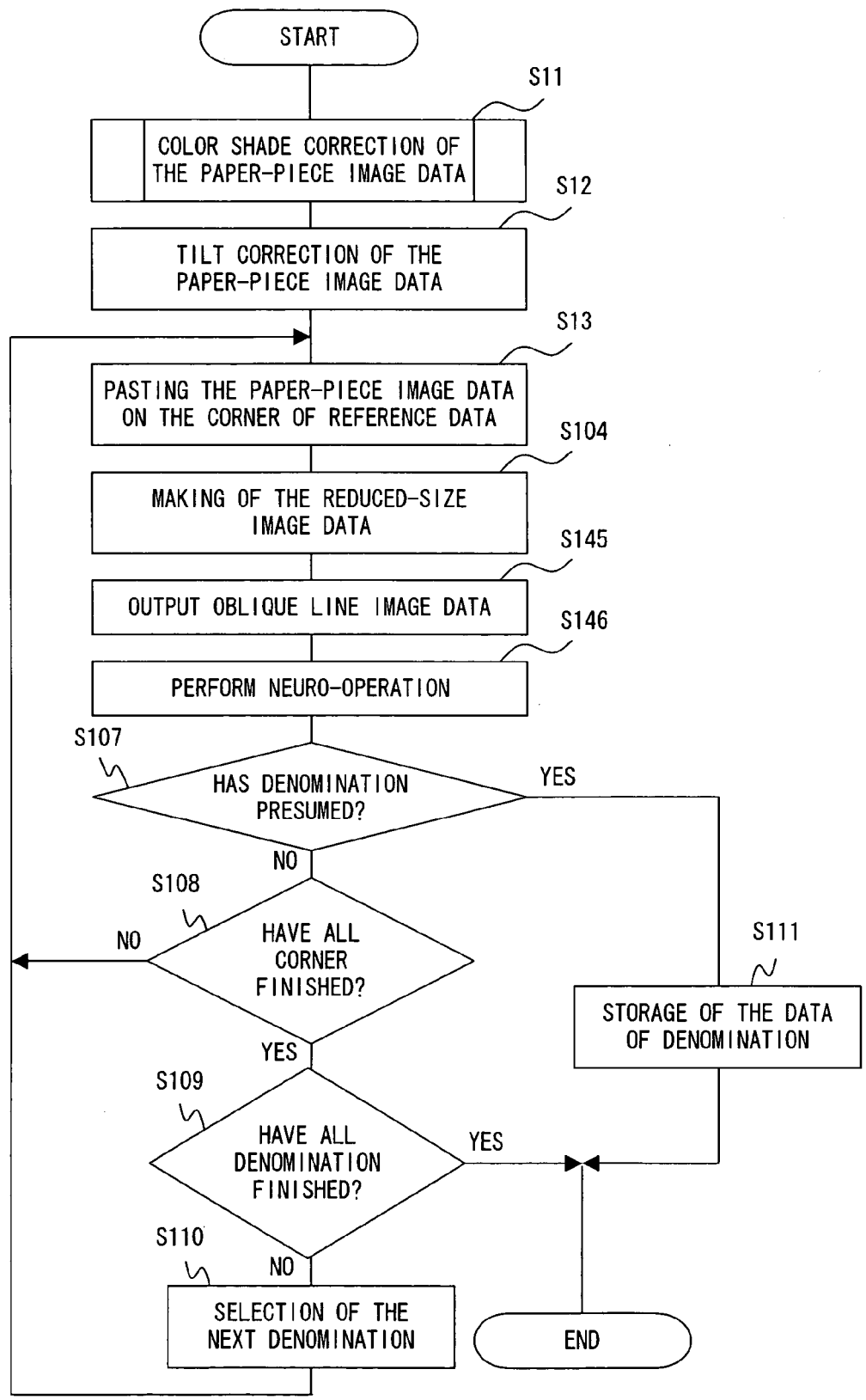
FIG. 30 is a flowchart explaining the process that the paper discrimination device of the secondary preferred embodiments recognizes the oblique line image pattern by neuro-operation and discriminates the denominations of the piece of paper.

FIG. 30 is a flowchart that shows the flow of the performance of paper-piece discrimination device 200 that discriminates the denomination of the piece of paper by the pattern recognition in oblique line image (either the left-oblique line image or the right-oblique line image). In FIG. 30, the steps, which have the same process as those of FIG. 27 are given the same number as in FIG. 27, and the explanation for those steps, are omitted.

The image manipulation unit 17A makes the reduced-size data 302 (Step S104), and outputs any of the oblique line images (the line including the paper-piece image data 42) of the reduced-size data 302 to the neuro-operation unit 201 (Step S145). The neuro-operation unit 201 inputs the oblique line image as the input pattern, and outputs the output pattern, which corresponds to the input pattern to the central processing unit 11 (Step S146). The central processing unit 11 discriminates the denomination and direction of the piece of paper by analyzing the output pattern.

In addition, in the secondary preferred embodiments, when a part of the data from the reduced-size data 302 as the input pattern, the data of one vertical line, one horizontal line, one left-oblique line, and one right-oblique line are used as the input pattern. However, the line inputted can be a plural number of vertical, horizontal and oblique lines that can be used as the input pattern. Also, the part of the reduced-size data 302 used as the input pattern is not limited to be line-shaped. As long as the data includes a part of the paper-piece image data 42, the input pattern can be a shape other than a line.

In addition, both of the examination processes of the denomination, by the template comparison unit 18 in the primary preferred embodiments and by the neuro-operation unit 201 in the secondary preferred embodiments, can be combined and the system with higher accuracy on the denomination ascertainment can be established.

As it is explained above, according to the present invention, the for-comparison banknote image data for every denomination are made by pasting the image data of a piece of paper onto the reference data (the image data of the genuine banknotes) of every denomination. It is possible to identify the denomination of the piece of paper by the pattern matching of the for-comparison banknote image data and the template with corresponding denomination.

Moreover, in the present invention, the introduction cost can be kept low because there is no need to change the hardware of the existing device. The introduction of the present invention only requires a change in software. By equipping the banknote processor, used for the operation in unattended stores and the operation for 24 hours, with the present invention, it is possible to always determine even if a banknote balance is torn inside the device. Therefore the utilization of the present invention is of great value. The present invention can be applied to the whole unattended machine, such as ATM, CD (Cash Dispenser), vending machine, and the ticket seller machine at stations, that transacts the deposit and the payment of a banknote, is expected to show the rapid increase along with the reduction of labor cost in the future.

What is claimed is:

1. A paper-piece discrimination device, comprising:
   a reference data storage unit storing at least one denomination of reference data that is image data of a genuine banknote;
   a template storage unit storing a template for discrimination of genuine banknotes in a same number of denominations as stored in the reference data;
   a sensor unit acquiring image data of a paper-piece that is part of a paper sheet; and
   a template comparison unit making for-comparison banknote image data of every denomination by synthesizing the image data of the paper-piece acquired by the sensor unit and the reference data of every denomination stored in the reference data storage unit, and discriminating a corresponding denomination of the paper-piece by applying a pattern matching method of the for-comparison banknote image data with the template for the corresponding denomination stored in the template storage unit.

2. The paper-piece discrimination device according to claim 1, wherein the template comparison unit applies the pattern matching method in full image to the for-comparison banknote image data with the template.

3. The paper-piece discrimination device according to claim 1, wherein the template comparison unit applies the pattern matching method in a part image to the for-comparison banknote image data with the template.

4. The paper-piece discrimination device according to claim 3, wherein the template comparison unit applies the pattern matching method in a horizontal line image to the for-comparison banknote image data with the template.

5. The paper-piece discrimination device according to claim 3, wherein the template comparison unit applies the pattern matching method in a vertical line image to the for-comparison banknote image data with the template.

6. The paper-piece discrimination device according to claim 3, wherein the template comparison unit applies the pattern matching method in an oblique line image to the for-comparison banknote image data with the template.

7. The paper-piece discrimination device according to claim 1, wherein the template comparison unit applies the pattern matching method in full image, the pattern matching method in a horizontal line image, the pattern matching method in a vertical line image, the pattern matching method in an oblique line image successively to the for-comparison banknote image data with the template, and, from results of these pattern matching methods, discriminates the corresponding denomination of the paper-piece.

8. The paper-piece discrimination device according to claim 1, wherein the template comparison unit makes at least one for-comparison banknote image data by pasting the image data of the paper-niece on the corner of the reference data.

9. The paper-piece discrimination device according to claim 1, wherein the template comparison unit, in making the for-comparison banknote image data, determines a pasting position of the image data of the paper-piece on the reference data depending on a shape of the for-comparison banknote image data.

10. The paper-piece discrimination device according to claim 1, wherein the template comparison unit discriminates not only the corresponding denomination of the paper-piece but also a position of the paper-piece on the genuine banknote for the corresponding denomination.

11. A paper-piece discrimination device, comprising:
    a reference data storage unit storing at least one denomination of reference data that is image data of a genuine banknote;
    a sensor unit acquiring an image of a paper-piece, that is part of a paper sheet;
    an image manipulation unit making for-comparison banknote image data comparing with the reference data of every denomination by synthesizing the image data of the paper-piece acquired in the sensor unit and the reference data of every denomination stored in the reference data storage unit; and
    a neuro-operation unit that inputs the for-comparison banknote image data as an input pattern, performs a neuro-operation and outputs an output pattern indicating a corresponding denomination of the paper-piece.

12. The paper-piece discrimination device according to claim 11, wherein the input pattern is a part of the for-comparison banknote image data.

13. The paper-piece discrimination device according to claim 11, wherein the input pattern is a vertical line image of the for-comparison banknote image data.

14. The paper-piece discrimination device according to claim 12, wherein the input pattern is a horizontal line image of the for-comparison banknote image data.

15. The paper-piece discrimination device according to claim 12, wherein the input pattern is an oblique line image of the for-comparison banknote image data.

16. The paper-piece discrimination device according to claim 11, wherein the neuro-operation unit outputs position data on a position of the paper-piece on an original banknote in addition to the corresponding denomination of the paper-piece both as the output pattern.

17. A paper-piece discrimination method comprising:
    storing at least one denomination of reference data that is image data of a genuine banknote in a primary storage unit;
    storing a template for discrimination of genuine banknotes in a same number of denominations as stored in the reference data in a secondary storage unit;
    acquiring an image of a paper-piece, that is part of a paper sheet; and
    making for-comparison banknote image data of every denomination by synthesizing the image data of the paper-piece acquired and the reference data of every denomination stored in the primary storage unit, and discriminating a corresponding denomination of the paper-piece by applying a pattern matching method of the for-comparison banknote image data with the template for the corresponding denomination stored in the secondary storage unit.

18. A paper-piece discrimination method comprising:
storing at least one denomination of reference data that is image data of a genuine banknote in a primary storage unit;
storing a template for a discrimination of genuine banknotes in a same number of denominations as stored in the reference data in a secondary storage unit;
acquiring an image of a paper-piece, that is part of a paper sheet; and
making for-comparison banknote image data of every denomination by synthesizing the image data of the paper-piece acquired and the reference data of every denomination stored in the primary storage unit; and
discriminating a corresponding denomination of the paper-piece by performing a neuro-operation, with the image of the paper-piece as an input pattern and outputting the denomination of the paper-piece.

19. A computer-readable medium storing a program, making a computer perform a method comprising:
storing at least one denomination of reference data that is image data of a genuine banknote in a primary storage unit;
storing a template for the discrimination of genuine banknotes in a same number of denominations as stored in the reference data in a secondary storage unit;
acquiring an image of a paper-piece, that is part of a paper sheet;
making for-comparison banknote image data of every denomination by synthesizing the image data of the paper-piece and the reference data of every denomination stored in the primary storage unit; and
discriminating a corresponding denomination of the paper-piece by applying, pattern matching method of the for-comparison banknote image data with the template for the corresponding denomination stored in the secondary storage unit.

20. A computer-readable medium storing a program, making a computer perform a method comprising:
storing at least one denomination of reference data that is image data of a genuine banknote in a primary storage unit;
storing a template for discrimination of genuine banknotes in a same number of denominations as stored in the reference data in a secondary storage unit;
acquiring an image of a paper-piece, that is part of a paper sheet; and
making for-comparison banknote image data of every denomination by synthesizing the image data of the paper-piece and the reference data of every denomination stored in the primary reference data storage unit; and
discriminating the denomination of the paper-piece by performing a neuro-operation, with the image of the paper-piece as an input pattern and outputting the denomination of the paper-piece.

* * * * *

UNITED STATES PATENT AND TRADEMARK OFFICE
CERTIFICATE OF CORRECTION

| | | |
|---|---|---|
| PATENT NO. | : 7,097,022 B2 | Page 1 of 1 |
| APPLICATION NO. | : 11/047663 | |
| DATED | : August 29, 2006 | |
| INVENTOR(S) | : Masanori Mukai | |

It is certified that error appears in the above-identified patent and that said Letters Patent is hereby corrected as shown below:

Column 18, Line 2, change "paper-niece" to --paper-piece--.

Column 20, Line 4, change "applying," to --applying a--.

Signed and Sealed this

Sixteenth Day of January, 2007

JON W. DUDAS
*Director of the United States Patent and Trademark Office*